US010107632B2

(12) United States Patent
Lalonde et al.

(10) Patent No.: US 10,107,632 B2
(45) Date of Patent: Oct. 23, 2018

(54) ASSISTED ROADMAP GENERATION

(71) Applicant: X Development LLC, Mountain View, CA (US)

(72) Inventors: Geoffrey Lalonde, La Honda, CA (US); Peter Anderson-Sprecher, Los Altos Hills, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/939,635

(22) Filed: Mar. 29, 2018

(65) Prior Publication Data

US 2018/0224282 A1 Aug. 9, 2018

Related U.S. Application Data

(63) Continuation of application No. 15/730,422, filed on Oct. 11, 2017, now Pat. No. 9,964,411, which is a continuation of application No. 15/282,657, filed on Sep. 30, 2016, now Pat. No. 9,816,822.

(51) Int. Cl.
*G01C 21/30* (2006.01)
*G06F 17/30* (2006.01)

(52) U.S. Cl.
CPC ....... *G01C 21/30* (2013.01); *G06F 17/30241* (2013.01); *Y10S 901/01* (2013.01)

(58) Field of Classification Search
CPC .......................... G01C 21/30; G06F 17/30241
USPC ...................................................... 701/450
See application file for complete search history.

(56) References Cited

U.S. PATENT DOCUMENTS

| 5,109,340 | A | 4/1992 | Kanayama |
| 5,752,207 | A | 5/1998 | Sarangapani |
| 6,134,486 | A | 10/2000 | Kanayama |
| 7,089,162 | B2 | 8/2006 | Nagel |
| 9,221,481 | B2 | 12/2015 | Desbordes et al. |
| 9,533,626 | B2 * | 1/2017 | Forni ............. B61L 23/041 |
| 9,746,854 | B2 * | 8/2017 | Berkemeier ....... G05D 1/0212 |

(Continued)

OTHER PUBLICATIONS

N. W. Garrick,"Geometric Design of Transportation Facilities", Lectures 5-8, Feb. 11, 2002, available via the Internet at www.engr.uconn.edu/~garrick/ce371/I05-08.htm (last visited May 23, 2016).

(Continued)

*Primary Examiner* — Muhammad Shafi
(74) *Attorney, Agent, or Firm* — McDonnell Boehnen Hulbert & Berghoff LLP

(57) ABSTRACT

Systems and methods related to roadmaps for mobile robotic devices are provided. A computing device can receive a roadmap. The roadmap can include an intersection between first and second edges. The computing device can determine a transition curve between the first and second edges and includes first, second, and third curve segments. The first and second curve segments can connect at a first curve junction point. The second and third curve segments can connect at a second curve junction point. The first and third curve segments each include a segment of an Euler spiral and the second curve segment can be a circular curve segment having a fixed radius. The computing device can update the roadmap by replacing the intersection between the first and second edges with the transition curve. The computing device can provide the updated roadmap.

20 Claims, 13 Drawing Sheets

(56) References Cited

U.S. PATENT DOCUMENTS

| | | |
|---|---|---|
| 9,816,822 B1 | 11/2017 | Lalonde et al. |
| 2002/0169546 A1 | 11/2002 | Nagel |
| 2013/0000675 A1 | 1/2013 | Hong et al. |
| 2015/0022447 A1 | 1/2015 | Hare et al. |
| 2015/0161823 A1* | 6/2015 | Anderson-Sprecher ............... G06T 15/005 345/419 |
| 2016/0282126 A1* | 9/2016 | Watts .................. G01C 21/206 |

OTHER PUBLICATIONS

D. H. Shin et al., "Path Generation for Robot Vehicles Using Composite Clothoid Segments", Dec. 1990, Technical Report No. CMU-RI-TR-90-31, Robotics Institute, Carnegie-Mellon University.

Trimble, Inc., "K Value", Novapoint Wiki, Sep. 8, 2014, available via the Internet at web.archive.org/web/20140908025806/http://wiki.novapoint.com/doku.php/en:np:road:menu:alignment_design:ad_suppinfo:k_value (last visited Oct. 9, 2016).

M. West, "Dynamics—Track Transition Curves", May 22, 2016, available via the Internet at dynref.engr.illinois.edu/avt.html (last visited May 22, 2016).

E. W. Weisstein, "Cornu Spiral", Apr. 9, 2004, available via the Internet at mathworld.wolfram.com/CornuSpiral.html last visited May 21, 2016).

\* cited by examiner

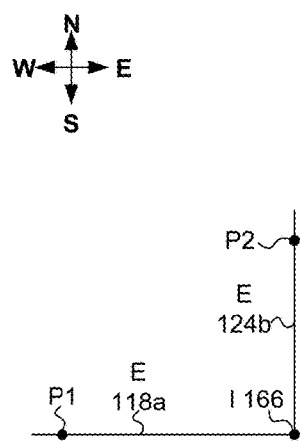
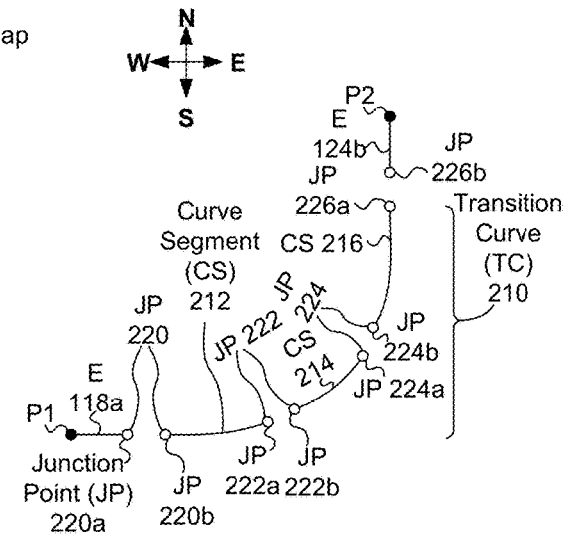
FIG. 2A  FIG. 2B
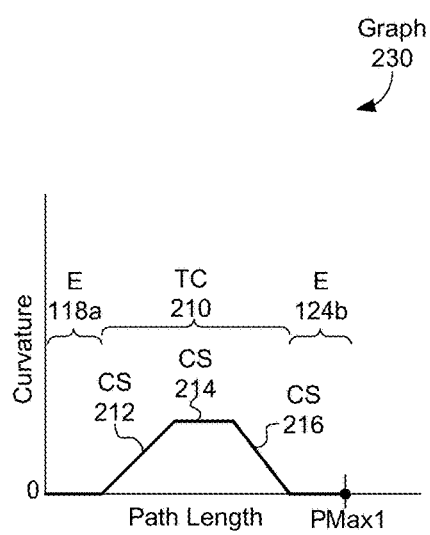
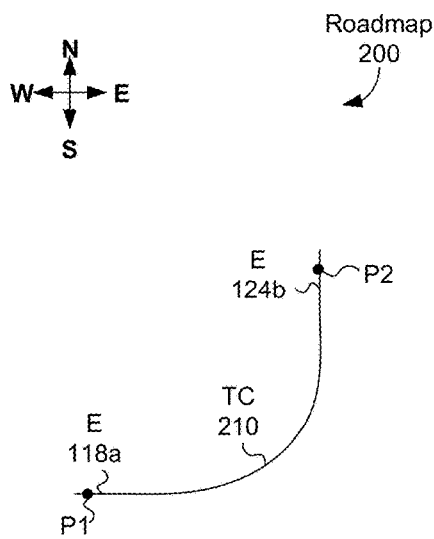
FIG. 2C  FIG. 2D

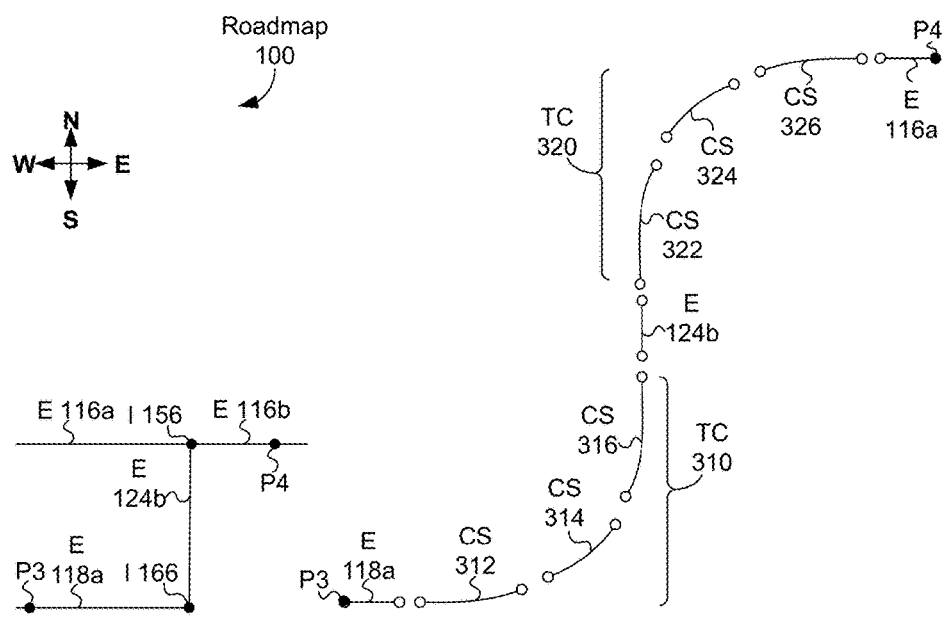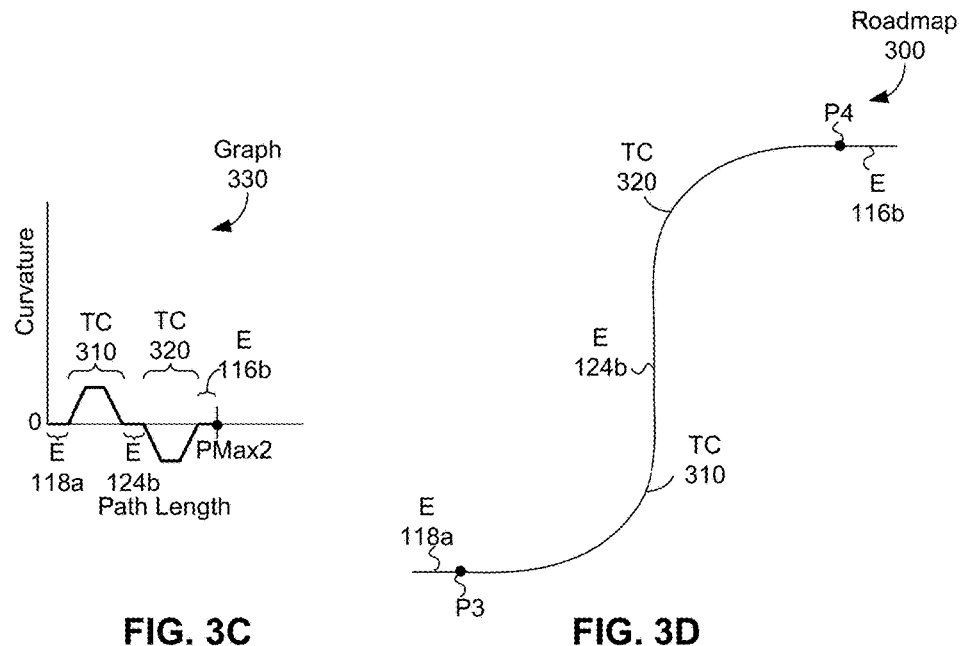

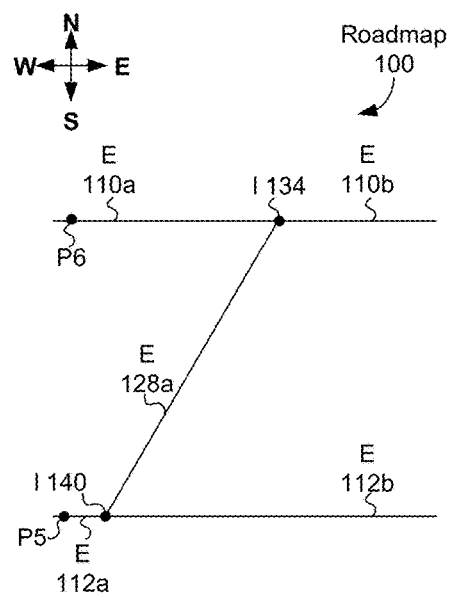
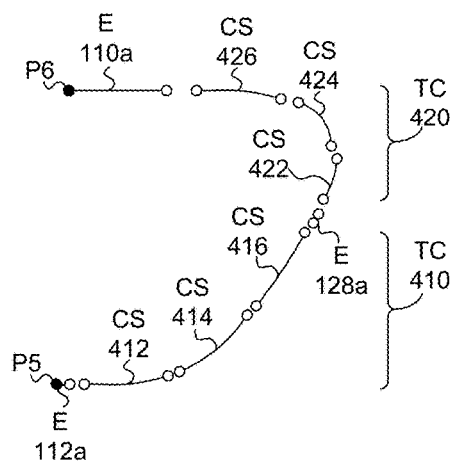
FIG. 4A
FIG. 4B
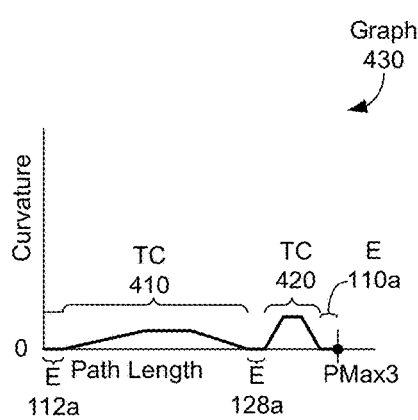
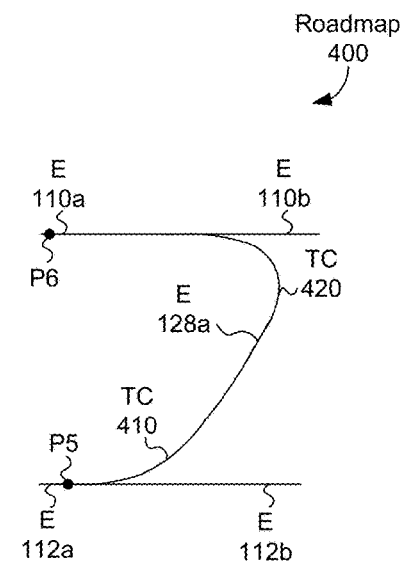
FIG. 4C
FIG. 4D

ASSISTED ROADMAP GENERATION

CROSS-REFERENCE TO RELATED APPLICATIONS

This patent application is a continuation application of U.S. patent application Ser. No. 15/730,422, filed on Oct. 11, 2017, entitled "Assisted Roadmap Generation", which is a continuation of Ser. No. 15/282,657, filed on Sep. 30, 2016, entitled "Assisted Roadmap Generation", the contents of each of which are entirely incorporated by reference herein for all purposes.

BACKGROUND

One or more robots and/or other actors, such as human actors, can move throughout a space, such as the interior of part or all of a building and/or its surrounding outdoor regions, to perform tasks and/or otherwise utilize the space together. One example of a building is a warehouse, which may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed in the warehouse to operate machines, vehicles, and other equipment. In some cases, one or more of the machines or vehicles may be robotic devices guided by computer control systems.

Mobile robotic devices can be used in a number of different environments to accomplish a variety of tasks. For example, mobile robotic devices can deliver items, such as parts or completed products, within indoor environments, such as warehouses, hospitals and/or data centers. When mobile robotic devices are deployed, they can use one or more possible paths to and from delivery and/or other locations. These paths can be determined using one or more route planning algorithms.

SUMMARY

In one aspect, a method is provided. A computing device receives a roadmap that includes an intersection between a first edge and a second edge. The computing device determines a transition curve between the first edge and the second edge, where the transition curve including a first curve segment, a second curve segment, and a third curve segment. The first curve segment connects to the second curve segment at a first curve junction point and the second curve segment connects to the third curve segment at a second curve junction point. The first and third curve segments each include a segment of an Euler spiral, and the second curve segment is a circular curve segment having a fixed radius. The computing device updates the roadmap by replacing the intersection in the roadmap with the transition curve between the first edge and the second edge. The computing device provides the updated roadmap.

In another aspect, a computing device is provided. The computing device includes one or more processors and data storage. The data storage includes at least computer-executable instructions stored thereon that, when executed by the one or more processors, cause the computing device system to perform functions. The functions include: receiving a roadmap that includes an intersection between a first edge and a second edge; determining a transition curve between the first edge and the second edge, the transition curve including a first curve segment, a second curve segment, and a third curve segment, where the first curve segment connects to the second curve segment at a first curve junction point, where the second curve segment connects to the third curve segment at a second curve junction point, where the first and third curve segments each include a segment of an Euler spiral, and where the second curve segment is a circular curve segment having a fixed radius; updating the roadmap by replacing the intersection in the roadmap with the transition curve between the first edge and the second edge; and providing the updated roadmap.

In another aspect, a non-transitory computer readable medium is provided. The non-transitory computer readable medium has stored thereon instructions, that when executed by one or more processors of a computing device, cause the computing device to perform functions. The functions include: receiving a roadmap that includes an intersection between a first edge and a second edge; determining a transition curve between the first edge and the second edge, the transition curve including a first curve segment, a second curve segment, and a third curve segment, where the first curve segment connects to the second curve segment at a first curve junction point, where the second curve segment connects to the third curve segment at a second curve junction point, where the first and third curve segments each include a segment of an Euler spiral, and where the second curve segment is a circular curve segment having a fixed radius; updating the roadmap by replacing the intersection in the roadmap with the transition curve between the first edge and the second edge; and providing the updated roadmap.

In another aspect, an apparatus is provided. The apparatus includes: means for receiving a roadmap that includes an intersection between a first edge and a second edge; means for determining a transition curve between the first edge and the second edge, the transition curve including a first curve segment, a second curve segment, and a third curve segment, where the first curve segment connects to the second curve segment at a first curve junction point, where the second curve segment connects to the third curve segment at a second curve junction point, where the first and third curve segments each include a segment of an Euler spiral, and where the second curve segment is a circular curve segment having a fixed radius; means for updating the roadmap by replacing the intersection in the roadmap with the transition curve between the first edge and the second edge; and means for providing the updated roadmap.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 2A shows a portion of the roadmap of FIG. 1 with an intersection, in accordance with an example embodiment.

FIG. 2B shows an expanded transition curve related to the intersection shown in FIG. 2A, in accordance with an example embodiment.

FIG. 2C shows a curvature graph for the transition curve of FIG. 2B, in accordance with an example embodiment.

FIG. 2D shows a roadmap with the intersection of FIG. 2A replaced with the transition curve of FIG. 2B, in accordance with an example embodiment.

FIG. 3A shows a portion of the roadmap of FIG. 1 with two intersections, in accordance with an example embodiment.

FIG. 3B shows two expanded transition curves related to the intersections shown in FIG. 3A, in accordance with an example embodiment.

FIG. 3C shows a curvature graph for the transition curves of FIG. 3B, in accordance with an example embodiment.

FIG. 3D shows a roadmap with the intersections of FIG. 3A replaced with the transition curves of FIG. 3B, in accordance with an example embodiment.

FIG. 4A shows another portion of the roadmap of FIG. 1 with two intersections, in accordance with an example embodiment.

FIG. 4B shows two expanded transition curves related to the intersections shown in FIG. 4A, in accordance with an example embodiment.

FIG. 4C shows a curvature graph for the transition curves of FIG. 4B, in accordance with an example embodiment.

FIG. 4D shows a roadmap with the intersections of FIG. 4A replaced with the transition curves of FIG. 4B, in accordance with an example embodiment.

DETAILED DESCRIPTION

Figure 1:
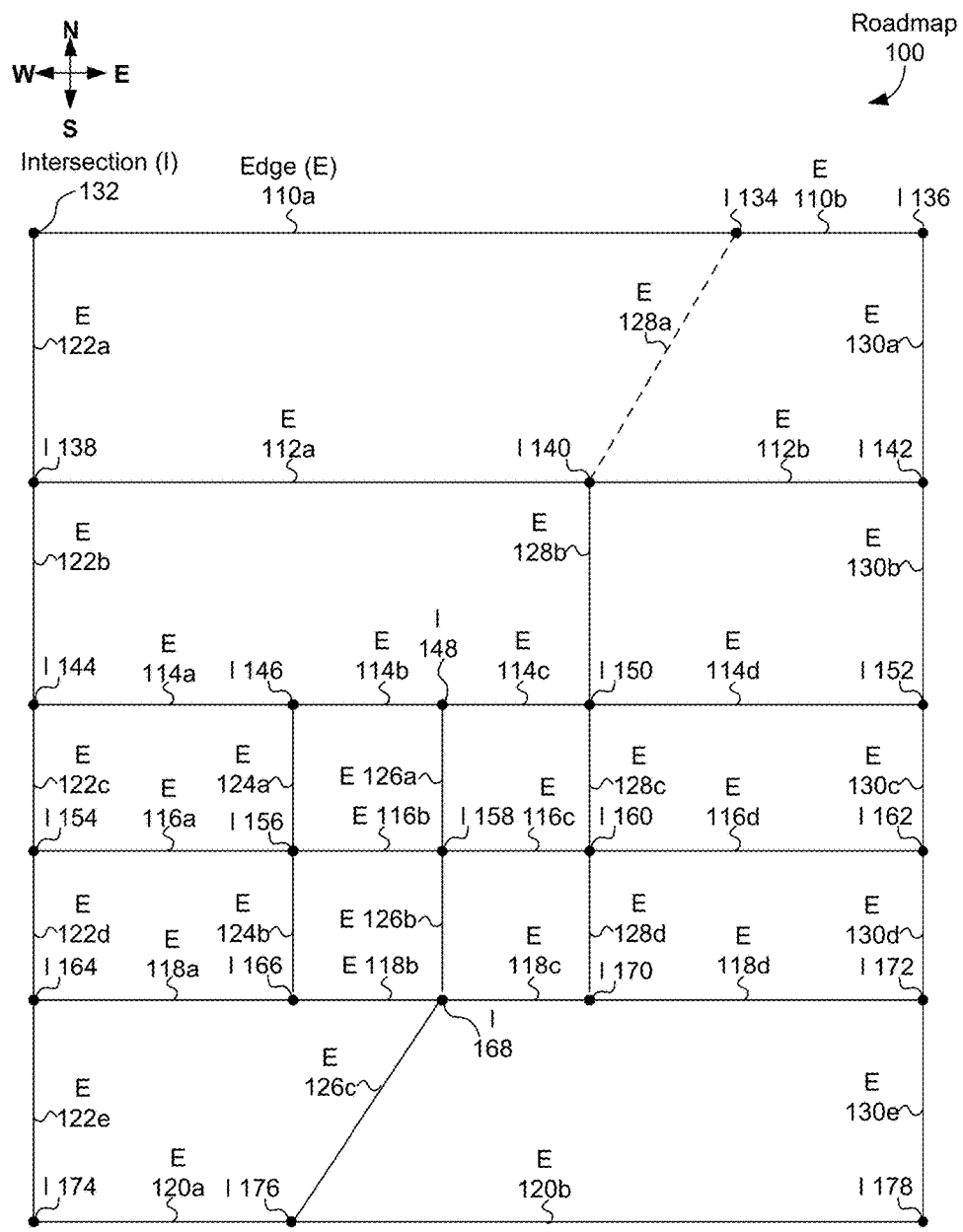
FIG. 1 shows a roadmap of an environment, in accordance with an example embodiment.

To accomplish tasks within an environment, a mobile robotic device can use a "roadmap", or set of routes within the environment, to travel in a safe and efficient fashion within the environment. The roadmap for autonomous vehicle navigation can have a discrete representation that can be used for multi-agent coordination; e.g., coordination between multiple robotic devices within the environment. The roadmap can be represented as a graph with edges representing routes within the environment and nodes representing terminal locations of routes and intersections between routes.

A roadmap of an environment, such as a warehouse, can facilitate coordinated navigation of robotic devices within the environment. To optimize robotic performance, the roadmap can enable fast, kinematically feasible movement in a way that prevents collisions with obstacles in the environment. Human operators typically use drawings or sketches of an environment as roadmaps for the environment. However, these drawings or sketches may not be suitable for use by robotic devices.

The herein-described techniques and examples involve generating roadmaps based on sparse prototype graphs using track transition curves to join travel lanes in a kinematically feasible way with minimal disruption of workflows within the environment. Paths that could result in collisions with warehouse fixtures and/or other robotic devices can be discarded or perturbed. For example, an intersection of the roadmap can be replaced by a "transition curve" having one or more curve segments. These transition curves and/or curve segments can be generated using spline approximations of curved paths, track transition curves, circular curves, Euler spiral segments, and/or other curve generating techniques.

For example, an intersection I between edges E1 and E2 meeting at angle A can be replaced by a bi-directed transition curve TC between E1 and E2 that sweeps through the angle A. The transition curve TC can be made up of one or more curve segments S1(TC), S2(TC) .... For example, transition curve TC can be made up of three curve segments S1(TC), S2(TC), and S3(TC), where S1(TC) can be an Euler spiral segment that goes from edge E1 to a junction point JP1 between S1(TC) and S2(TC), S2(TC) can be a circular arc segment that goes from JP1 to another junction point JP2 between S2(TC) and S3(TC), and S3(TC) can be an Euler spiral segment that goes from junction point JP2 to edge E2.

Rapid changes in velocity and/or acceleration can be kinematically unfeasible. Since both velocity and acceleration are vector valued quantities, a rapid change in direction can lead to a rapid change in velocity and/or acceleration. A rapid change in curvature along a path can lead to a rapid change in direction of the path; for example, taking a sharp corner of a path using a vehicle can quickly change curvature and direction of the path as well as leading to rapid changes in velocity and acceleration of the vehicle (and any occupants and/or cargo).

To ensure that changes in direction are kinematically feasible, a roadmap for robotic-device can replace intersections with transition curves, where changes in curvature of the transition curves can be limited based on kinematic parameters of robotic devices using the roadmap. For example, the changes in curvature of transition curves in the roadmap can be limited by a maximum change in curvature that is based on maximum velocity, minimum turning radius, and/or maximum acceleration values of a robotic device utilizing the roadmap.

Combinations of Euler spiral and circular curve segments can be used to provide kinematically feasible transition curves. Euler spiral curve segments have the property that the curvature of the segment is directly proportional to arc length, which allows for gradually increasing, and therefore kinematically feasible, curvature. Circular curve segments, which have a constant curvature, can be selected to have a maximum curvature that is based on kinematic constraints of a robotic device (e.g., minimum turning radius). Also, circular curve segments can be selected to conforming to one or more acceleration constraints while allowing faster travel that Euler spiral curve segments.

A junction point between an Euler spiral curve segment and a circular curve segment can be reached when the curvature of the Euler spiral segment at a junction point is equal to the (constant) curvature of the central circular segment at the junction point. In some embodiments, the junction point between an Euler spiral curve segment and a circular curve segment can be reached when the curvature of the Euler spiral segment at the junction point is equal or nearly equal to the curvature of the circular curve segment; e.g., when the absolute value of the difference between curvatures at the junction point is within some (small) threshold value.

Combinations of transition curves can replace paths involving multiple intersections with kinematically feasible pathways that do not intersect. Other combinations of transition curves are possible as well, where some of these combinations are discussed below.

The use of transition curves using Euler spiral curve segments and circular curve segments enables replacement of intersections, thereby preventing collisions with obstacles and/or robotic devices in the environment. The use of both Euler spiral curve segments and circular curve segments take up a relatively small amount of area within the environment, thereby being space-efficient. Further, transition curves can be selected to be kinematically feasible for actual use by robotic devices performing tasks in the environment.

Generating Roadmaps Using Transition Curves

FIG. 1 shows a rectangular roadmap of an environment, in accordance with an example embodiment. Roadmap 100 can represent an indoor environment (e.g., part or all of a warehouse, a factory, office space), an outdoor environment (e.g., part or all of a parking lot, road network, park, farmland), or a combination indoor/outdoor environment (e.g, a building and an associated parking lot and/or road network). Many other example environments are possible as well.

Roadmap 100 includes edges (Es) 110a, 110b, 112a, 112b, 114a, 114b, 114c, 114d, 116a, 116b, 116c, 116d, 118a, 118b, 118c, 118d, 120a, 120b, 122a, 122b, 112c, 122d, 122e, 124a, 124b, 126a, 126b, 126c, 128a, 128b, 128c, 128d, 130a, 130b, 130c, 130d, 130e and intersections (Is) 132, 134, 136, 138, 140, 142, 144, 146, 148, 150, 152, 154, 156, 158, 160, 162, 164, 168, 170, 172, 174, 176, 178. In roadmap 100, edges can come together at intersections. For example, edges 112a, 128a, 112b, and 128b come together at intersection 140.

Robotic devices can perform tasks within the environment by traveling along predetermined routes specified using roadmap 100; e.g., combinations of edge(s) and intersection(s) of roadmap 100. Then, a robotic device can be instructed to follow one of the predetermined routes to carry out the task. In some examples, robotic devices in the environment represented by roadmap 100 can be mobile robotic devices equipped to carry objects stored in various locations For example, a robotic device RD3 can be instructed to convey items from a starting point in the environment represented by intersection 136 to an ending point on edge 112a. To carry out the example task, RD3 can obtain the items at the starting pint and take a route R1 to the ending point, where R1 can include intersection 136 as a starting point, edge 110b, intersection 134, edge 128a, intersection 140, and a portion of edge 112a that ends at the ending point. Robotic device RD3 can obtain data from the environment provided by on-board sensors, such as cameras, radar, proximity sensors, and perhaps other sensors, to avoid collisions along a route such as R1.

FIG. 2A shows a portion of roadmap 100 with intersection 166, in accordance with an example embodiment. As shown in both FIGS. 1 and 2A, intersection 166 is at a point where at least edges 118a and 124b come together; e.g., intersect. FIG. 2A also indicates that a path from point P1 and P2 specified using roadmap 100 would involve use of intersection 166. As such, a robotic device traveling from P1 to P2 (or vice versa) would likely have to slow down or stop to travel through intersections 156 and 166. In some examples, intersections of roadmaps can be replaced by transition curves. In the specific example where intersection 166 is to be replaced by a transition curve, the transition curve can go between a point to the right of point P1 on edge 118a and a point below point P2 on edge 124b.

FIG. 2B shows an expanded transition curve 210 related to intersection 166 shown in FIG. 2A, in accordance with an example embodiment. Transition curve 210 includes curve segments (CSs) 212, 214, and 216 that connect a portion of edge 118a starting at point P1 to a portion of edge 124b that ends at point P2. A curve segment of a transition curve can have one or two junction points, which can be an end point of the curve segment that meets another curve segment. In expanded transition curve 210, separate junction points are shown on each edge or curve segment that meets another edge or curve segment and with space separating junction points for clarity's sake. For example, junction point (JP) 220 is also shown as junction points 220a and 220b, where junction point 220a is a point of edge 118a that meets junction point 220b of curve segment 220b. FIG. 2B also shows curve segment 214 with junction points 222b and 224a, curve segment 216 with junction points 224b and 226a, and edge 124b with junction point 226b.

Each of curve segments 212 and 216 can be a segment of an Euler spiral. An Euler spiral has the property that the curvature $\kappa$ along a segment of the Euler spiral is proportional to a position s along the segment of the Euler spiral; e.g., $\kappa = \alpha s$ for some constant value $\alpha$. The value s can be termed the arc length, path length, or displacement along the segment of the Euler spiral. This property of Euler spirals implies that a magnitude of acceleration a of a robotic device traveling along the segment of the Euler spiral increases at a constant rate if the robotic device travels at a constant velocity v.

The Euler spiral can be written in terms of the Fresnel integrals C(z) and S(z) shown in Equations (1) and (2) below $$C(z) = \int_0^z \cos(\tfrac{1}{2}\pi u^2) du \quad (1)$$

$$S(z) = \int_0^z \sin(\tfrac{1}{2}\pi u^2) du \quad (2)$$

Then, a point r on a position s along an Euler spiral in a two-dimensional x-y plane can specified in terms of x and y coordinates using Equation (3) below:

$$r = lC\left(\frac{s}{l}\right)x + lS\left(\frac{s}{l}\right)y \quad (3)$$

where:

$$l = \sqrt{\pi/\alpha}$$

In some embodiments, the use of Euler spirals as curve segments can be generalized to use of one or more other continuous functions that exhibit different and/or better properties for specific kinematic descriptions.

Curve segment 214 can be a circular arc that goes between curve segments 212 and 216. A point p(θ) of (circular) arc of a circle of radius R centered at point C=($C_x$, $C_y$) at angle θ in the two-dimensional x-y plane can be determined using Equation (4) below:

$$p(\theta) = \{C_x + R\cos(\theta)\}x + \{C_y + R\sin(\theta)\}y \quad (4)$$

The value θ for the circular arc described using Equation (3) can range from an initial angle $\theta_I$ to a final angle $\theta_F$. Then, curve segment 214 can be described using three parameters: initial angle $\theta_I$, final angle $\theta_F$, and radius R. The curvature κ of curve segment 214 is κ=1/R; that is, for a fixed value of R, the curvature of a circular arc, such as curve segment 214, is fixed.

Junction points 222 and 224 can be determined based on the initial angle $\theta_I$, final angle $\theta_F$, and radius R parameters for curve segment 214, the arc lengths (and thus the curvatures) of curve segments 212 and 216, the geometry of an intersection being replaced, geometries of one or more obstacles in the environment, and kinematic parameters of robotic devices utilizing transition curve 210. For example, suppose that at junction point 222 where curve segments 212 and 214 come together, a curvature $\kappa_{212}$ at a position s at junction point 222a on curve segment 212 is to be within a threshold value $\kappa_{THR}$ of the curvature $\kappa_{214}$ of at junction point 222b on curve segment 214, where the threshold value $\kappa_{THR} \geq 0$ can specify a maximum difference in curvature between two adjacent curve segments. That is, when $\kappa_{212}$ and $\kappa_{212}$ are within threshold value $\kappa_{THR}$, then $|\kappa_{212} - \kappa_{214}| = |\alpha s - 1/R| \leq \kappa_{THR}$.

If $\kappa_{THR}$ is relatively small compared to $\kappa_{212}$ and $\kappa_{214}$, then $\alpha s \approx 1/R$, and $$so \approx \frac{1}{\alpha S} \approx \frac{1}{\kappa_{212}}.$$

Thus, for curvature $\kappa_{212}$ to be within the threshold value $\kappa_{THR}$ of the curvature $\kappa_{214}$ of curve segment 214 radius of curve segment 214 at junction point 222, the radius R of curve segment 214 has to be approximately equal to $1/\kappa_{212}$ at junction point 222. Similarly, if a curvature $\kappa_{214}$ of curve segment 214 is to be within a threshold value $\kappa_{THR}$ of the curvature $\kappa_{216}$ of curve segment 216 at junction point 224 where curve segments 214 and 216 come together, the radius R of curve segment 214 has to be approximately equal to $1/\kappa_{216}$ at junction point 224.

The angles $\theta_I$ and $\theta_F$ for curve segment 214 can be determined based on the geometry of edges coming together at an intersection that is to be replaced by a transition curve. For example, if an intersection IREP is a point where edges EREP1 and EREP2 come together at a normalized angle $\theta_{REP}$ with $0 < \theta_{REP} < 180°$ assuming that edges EREP1 and EREP2 are not overlapping edges and that $\theta_{REP}$ has been normalized to a positive value measured in degrees. Then the difference between $\theta_F - \theta_I$ can be less than or equal to $\theta_{REP}$. For example, suppose $\theta_{REP} = 90°$—that is edges EREP1 and EREP2 come together at right angles. Then, if $\theta_F - \theta_I$ were greater than 90°, a circular arc portion of a transition curve replacing IREP would exceed 90° and so would not fit the geometry of EREP1, EREP2, and IREP.

As another example of how transition curve 210 can be determined based on the geometry of edges around an intersection being replaced (e.g., the geometry of edges 118a, 124b and intersection 166), a transition curve can be specified based on a maximum or minimum length that a curve segment can run along an edge of an intersection being replaced. For example, junction point 220 can be selected based on a maximum distance along edge 118a that curve segment 212 can run; e.g., the maximum distance can be less than or equal to the distance between P1 and intersection 166. As another example, junction point 226 can be selected based on a minimum distance along edge 124b that curve segment 216 can run; e.g., at least DX % of the distance between intersection I 166 and point P2, where DX % can be a value greater than 0 such as 33.33%, 50%, 60%, or another value. Many other examples of selecting transition curves and/or curve segments based on geometries of edges and intersections are possible as well.

The initial angle $\theta_I$, final angle $\theta_F$, and radius R for curve segment 214 and thus junction points 222 and 224 with respective curve segments 212 and 216 can be determined based on one or more kinematic parameters of a robotic device. Examples of these kinematic parameters include, but are not limited to, a turning radius of a robotic device, a maximum speed/velocity of the robotic device, and a maximum acceleration of a robotic device. For example, radius R can be bounded below by a minimum turning radius of a robotic device. As another example, threshold value $\kappa_{THR}$ can be selected based on a maximum speed/velocity of the robotic device and/or a maximum acceleration of the robotic device. As indicated above, the threshold value $\kappa_{THR}$ can specify a maximum difference in curvature between two adjacent curve segments. As a change in curvature leads to a change in acceleration, and a change in acceleration can lead to a change in speed/velocity, the threshold value $\kappa_{THR}$ can be determined based on the maximum acceleration and/or the maximum speed/velocity of the robotic device.

In some embodiments, the threshold value $\kappa_{THR}$ can be the same for both junction points of transition curve 210. This implies the arc length $s_{212}$ of curve segment 212 is within a threshold value $s_{THR}$ of the arc length $s_{216}$ of curve segment 216, where threshold value $s_{THR}$ is based on the threshold value $\kappa_{THR}$ as arc length and curvature are directly related for Euler spiral segments such as curve segments 212 and 216.

In other embodiments, a threshold value $\kappa_{THR}$ can differ depending based on the junction point; e.g., the threshold value $\kappa_{THR}$ at junction point 222 can be different than the threshold value $\kappa_{THR}$ at junction point 224. In these embodiments, the curvature of curve segment 212 at junction point 222 can differ from the curvature of curve segment 216 at junction point 224, which implies that the arc length of curve segment 212 can differ from the arc length of curve segment 216 in these embodiments.

In still other embodiments, transition curves and curve segments can be determined based on geometries of one or more obstacles along a path for a robotic device. That is, the geometry of an obstacle can be modeled as one or more obstacle constraints. For example, obstacle constraints for a given obstacle O1 can specify areas where the robotic device should not travel to avoid collision with obstacle O1 based on the geometry of obstacle O1. These obstacle constraints can be used to generate roadmaps and/or plan paths that enable the robotic device to maximize traversal speed while avoiding the obstacles.

In other formulations, an arc length for one or more Euler spiral curve segments can be determined based on the parameters mentioned above and a maximum curve change rate parameter; e.g., an upper bound on the derivative of α. In some of these formulations, the maximum curve change rate parameter can be constrained to be (roughly) proportional to a maximum velocity of the robotic device. These formulations can then be used to determine α for more Euler spiral curve segment(s) and the initial angle $\theta_I$, final angle $\theta_F$, and/or radius R of a corresponding circular curve segment.

FIG. 2C shows curvature graph 230 for transition curve 210, in accordance with an example embodiment. Curvature graph 230 shows path length on the X axis and curvature on the Y axis, where curvature in a counter-clockwise direction is indicated as positive curvature on graph 230 and curvature in a clockwise direction is indicated as negative curvature on graph 230. Graph 230 illustrates curvature for a path beginning at point P1 on edge 118a, taking transition curve 210, and ending at point P2 on edge 124b. In graph 230, path length is shown starting at zero corresponding to beginning point P1 and increasing until reaching a maximum path length PMax1 corresponding to ending point P2.

Graph 230 indicates that the path from P1 to P2 makes piecewise-continuous changes in curvature along the path length. In particular, graph 230 shows:
- a first portion of a path from P1 to P2 has a constant curvature of 0, corresponding to a straight line taken from P1 following edge 118a until reaching junction point 220 with transition curve 210;
- a second portion of the path with three sections: a first section with a linearly-increasing positive curvature, corresponding to the linearly-increasing curvature of the path along Euler spiral of curve segment 212, a second section with a constant positive curvature, corresponding to the constant curvature of the path along the circular arc of curve segment 214, and a third section with a linearly-decreasing positive curvature, corresponding to a positive but linearly-decreasing curvature of the path along Euler spiral of curve segment 216; and
- a third portion of the path with constant zero curvature, corresponding to a straight line taken following edge 124b from junction point 226b to point P2.

FIG. 2D shows roadmap 200 with intersection 166 replaced with transition curve 210, in accordance with an example embodiment. Transition curve 210 includes curve segments 212, 214, and 216. A robotic device can be provided with or otherwise obtain roadmap 200 and subsequently be directed to travel from point P1 to point P2 (or vice versa) via transition curve 210; e.g., as part or all of a route used by the robotic device to carry out a task. Also, the robotic device using roadmap 200 to travel from P1 to P2 (or vice versa) can take transition curve 210 to avoid stopping at and/or slowing down for an intersection along the way, such as intersection 166 of roadmap 100.

FIG. 3A shows a portion of roadmap 100 with intersections 156 and 166, in accordance with an example embodiment. As shown in both FIGS. 1 and 3A, intersection 156 is at a point where at least edges 116b and 124b come together and intersection 166 is at a point where at least edges 118b and 124b come together. In some examples, intersections of roadmaps can be replaced by transition curves. In the specific example where intersections 156 and 166 could be replaced by respective transition curves, the transition curve replacing intersection 166 could go between a point to the right of point P3 on edge 118a and a point on edge 124b, and the transition curve replacing intersection 166 can go between a point on edge 124b and a point to the left of point P4 on edge 116b. FIG. 3A also indicates that a path from point P3 to point P4 using roadmap 100 would involve use of intersections 156 and 166. As such, a robotic device traveling from P3 to P4 (or vice versa) would likely have to slow down or stop to clear one or both of intersections 156 and 166.

FIG. 3B shows expanded transition curves 310 and 320 related to respective intersections 166 and 156 shown in FIG. 3A, in accordance with an example embodiment. Transition curve 310 includes curve segments 312, 314, and 316 and transition curve 320 includes curve segments 322, 324, and 326. Transition curves 310 and 320, along with edge 124b, connect a portion of edge 118a starting at point P3 to a portion of edge 116a that ends at point P4.

FIG. 3B shows that a portion of edge 124b is between curve segment 316 of transition curve 310 and curve segment 322 of transition curve 320. In the expanded transition curves 310, 320 shown in FIG. 3B, each junction point is shown using separate junction points for each edge or curve segment that meets another edge or curve segment and with space separating junction points.

Each of curve segments 312, 316, 322, and 326 can be a segment of an Euler spiral. Each of curve segments 314 and 324 can be a circular arc that goes between respective pairs of curve segments 312 and 316 and curve segments 322 and 326. Euler spirals and circular arcs are discussed above in more detail in the context of at least FIG. 2B. Junction points for transition curves 310 and 320 can be determined based on parameters of curve segments, the geometries of intersections 156 and 166 being replaced, and kinematic parameters of robotic devices using transition curves 310 and/or 320, such as discussed above in the context of FIG. 2B.

FIG. 3C shows curvature graph 330 for transition curves 310 and 320, in accordance with an example embodiment. Curvature graph 330 shows path length on the X axis and curvature on the Y axis, where curvature in a counter-clockwise direction is indicated as positive curvature on graph 230 and curvature in a clockwise direction is indicated as negative curvature on graph 230. Graph 330 illustrates curvature for a path beginning at point P3 on edge 118a, taking transition curves 310 and 320 in that order, and ending at point P4 on edge 116b. In graph 330, path length is shown starting at a zero corresponding to beginning point P3 and increasing until reaching a maximum path length PMax2 corresponding to ending point P4.

Graph 330 indicates that the path from P3 to P4 makes piecewise-continuous changes in curvature along the path length. In particular, graph 330 shows:
- a first portion of a path from P3 to P4 with constant zero curvature corresponding to a straight line taken following edge 118a from P3 to a junction point with curve segment 312 of transition curve 310;

a second portion of the path corresponding to transition curve 310 with three sections: a first section with linearly-increasing and positive curvature, a second section with constant positive curvature, and third section with positive but linearly-decreasing curvature, corresponding to the respective portions of the path utilizing the Euler spiral of curve segment 312, the circular arc of curve segment 314, and the Euler spiral of curve segment 316;

a third portion of the path with constant zero curvature, corresponding to a straight line taken following edge 124b from a junction point with curve segment 316 of transition curve 310 to a junction point with curve segment 322 of transition curve 320;

a fourth portion of the path corresponding to transition curve 320 with three sections: a first section with linearly-decreasing and negative curvature, a second section with constant negative curvature, and third section with linearly-increasing but negative curvature, corresponding to the respective portions of the path utilizing the Euler spiral of curve segment 322, the circular arc of curve segment 324, and the Euler spiral of curve segment 326; and a fifth portion of the path with constant zero curvature, corresponding to a straight line taken following edge 116b from a junction point with curve segment 326 of transition curve 320 to point P4.

FIG. 3D shows roadmap 300 with intersections 166 and 156 replaced with respective transition curves 310 and 320, in accordance with an example embodiment. Transition curve 310 includes curve segments 312, 314, and 316 and transition curve 320 includes curve segments 322, 324, and 326. In the example shown in both FIGS. 3B and 3D, edges 118a and 116a are both in the same horizontal (east-west) direction, while edge 124b is in a vertical (north-south) dimension. Further, in traveling from point P3 to point P4, transition curve 310 is oriented to curve in a horizontal-to-vertical fashion (from east-west to north-south), but transition curve 320 is oriented to curve in an opposite vertical-to-horizontal (from north-south to east-west) fashion. A robotic device following combined transition curves 310 and 320 to go from point P3 to P4 (or vice versa) can continue in the same horizontal direction while translating along the vertical direction. In other examples, transition curves can be used to continue in the same vertical direction and translate in the horizontal direction.

A robotic device can be provided with or otherwise obtain roadmap 300 and subsequently be directed to travel from point P3 to point P4 (or vice versa) via transition curves 310 and 320; e.g., as part or all of a route used by the robotic device to carry out a task. Also, the robotic device using roadmap 300 to travel from P3 to P4 (or vice versa) can take transition curves 310 and 320 to avoid stopping at and/or slowing down for one or more intersections along the way, such as intersection(s) 156 and/or 166 of roadmap 100.

In some scenarios, a robotic device can navigate and operate in an environment having one or more obstacles. In these scenarios, one objective in generating roadmaps and paths with transition curves is generating roadmaps and paths that avoid the obstacle(s). Techniques for generation of roadmaps and/or transition curves can then account for obstacles. One technique to account for obstacles is to model an obstacle as one or more obstacle constraints while generating transition curves. Once a path is generated with transition curves that meet the obstacle constraint(s), the robotic device can use the path to navigate around obstacles in the environment to complete tasks in a kinematically efficient fashion.

Figure 3E:
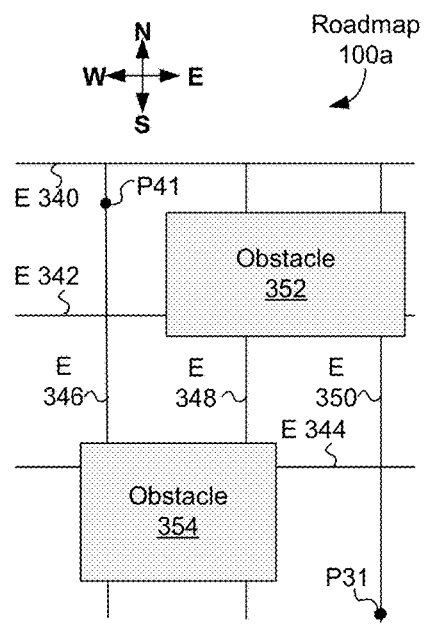
FIG. 3E shows a portion of another roadmap, in accordance with an example embodiment.

FIG. 3E shows roadmap 100a with edges 340, 342, 344, 346, 348, 350 and obstacles 352 and 354, in accordance with an example embodiment. As shown in FIG. 3E, edges 340, 342, and 344 run in a horizontal direction, while edges 346, 348, and 350 run in a vertical direction. Obstacle 352 covers part of edges 342, 348, and 350 and obstacle covers part of edges 344, 346, and 348.

A robotic device traveling from P31 to P41 (or vice versa) would have to navigate around obstacles 352 and 354, as obstacles 352 and 354 block some pathways in roadmap 100a. In particular, FIG. 3E also indicates that paths from point P31 to point P41 using roadmap 100a would be blocked by obstacles 352 and 354. For example, paths where a robotic device would travel north from point P31 (or south from point P41) using either edge 348 or edge 350 to either edge 340 or 342 are blocked by obstacle 352. As another example, some paths where the robotic device would travel west from point P31 (or east from point P41) using edge 344 are blocked by obstacle 354

In some examples, edges and intersections of roadmaps can be replaced by transition curves. In the specific example where the edges and intersections between point P31 and point P41 are replaced by one or more transition curves, the transition curves can be used to navigate around obstacles 352 and 354.

Figure 3F:
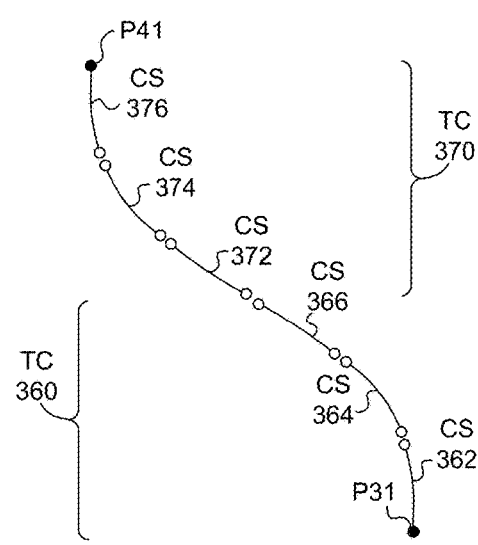
FIG. 3F shows two expanded transition curves related to the roadmap shown in FIG. 3E, in accordance with an example embodiment.

FIG. 3F shows two expanded transition curves 360 and 370 related to roadmap 100a, in accordance with an example embodiment. Transition curves 360 and 370 can be used as a path from point P31 to point P41 (or vice versa) that avoids obstacles 352 and 354. Transition curve 360 includes curve segments 362, 364, and 366, transition curve 370 includes curve segments 372, 374, and 376, and together transition curves 360 and 370 connect points P31 and P41.

In the expanded transition curves 360, 370 shown in FIG. 3F, each junction point is shown using separate junction points for each edge or curve segment that meets another edge or curve segment and with space separating junction points. Each of curve segments 362, 366, 372, and 376 can be a segment of an Euler spiral. Each of curve segments 364 and 374 can be a circular arc that goes between respective pairs of curve segments 362 and 366 and curve segments 372 and 376. Euler spirals and circular arcs are discussed above in more detail in the context of at least FIG. 2B. Junction points for transition curves 360 and 370 can be determined based on parameters of curve segments, the geometries of roadmap 100a and/or obstacles 352 and 354, and kinematic parameters of robotic devices using transition curves 360 and/or 370, such as discussed above in the context of FIG. 2B.

Figure 3G:
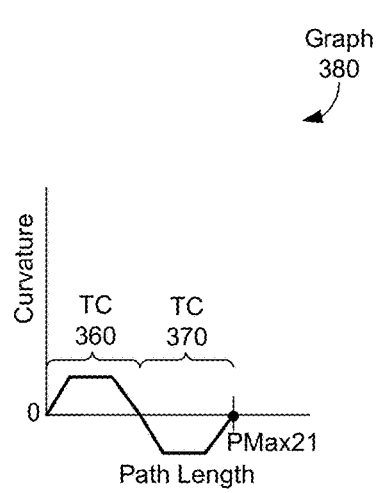
FIG. 3G shows a curvature graph for the transition curves of FIG. 3H, in accordance with an example embodiment.

FIG. 3G shows curvature graph 380 for transition curves 360 and 370, in accordance with an example embodiment. Curvature graph 380 shows path length on the X axis and curvature on the Y axis, where curvature in a counter-clockwise direction is indicated as positive curvature on graph 380 and curvature in a clockwise direction is indicated as negative curvature on graph 380. Graph 380 illustrates curvature for a path beginning at point P31 on transition curve 360, taking transition curves 360 and 370 in that order, and ending at point P41 on transition curve 370. In graph 430, path length is shown starting at zero corresponding to starting point P31 and increasing until reaching a maximum path length PMax21 corresponding to ending point P41.

Graph 380 indicates that the path from P31 to P32 makes piecewise-continuous changes in curvature along the path length. In particular, graph 380 shows:

a first portion of a path from P31 to P41 corresponding to transition curve 360 with three sections: a first section starting at P31 with zero curvature and then having linearly-increasing and positive curvature, a second section with constant positive curvature, and third section with linearly-decreasing but positive curvature, corresponding to the respective portions of the path utilizing the Euler spiral of curve segment 362, the circular arc of curve segment 364, and the Euler spiral of curve segment 366; and a second portion of the path corresponding to transition curve 370 with three sections: a first section with linearly-decreasing and negative curvature, a second section with constant negative curvature, and third section with linearly-increasing but negative curvature ending with zero curvature at point P41, corresponding to the respective portions of the path utilizing the Euler spiral of curve segment 372, the circular arc of curve segment 374, and the Euler spiral of curve segment 376.

Graph 380 also shows that the curvature of curve segment 366 is positive and that the curvature of curve segment 372 is negative. Graph 380 indicates that the curvature of curve segment 366 decreases to zero at a junction point with curve segment 372, and that the curvature of curve segment 372 starts at zero at the junction point with curve segment 366. Thus, the curvature of curve segments 366 and 372 changes in a continuous fashion while traveling between these two curve segments.

Figure 3H:
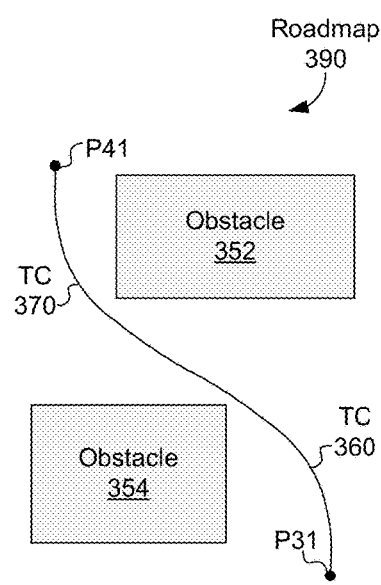
FIG. 3H shows a roadmap with the intersections of FIG. 3E replaced with the transition curves of FIG. 3F, in accordance with an example embodiment.

FIG. 3H shows a roadmap 390 with edges 340-350 replaced with respective transition curves 360 and 370, in accordance with an example embodiment. Transition curve 360 includes curve segments 362, 364, and 366 and transition curve 370 includes curve segments 372, 374, and 376.

In the example shown in FIG. 3H, transition curves 360 and 370 of roadmap 390 can be taken to travel between points P31 and P41 while avoiding obstacles 352 and 354. In traveling from point P31 to point P41, transition curve 360 is oriented to curve in a vertical-to-horizontal fashion, but transition curve 370 is oriented to curve in an opposite horizontal-to-vertical fashion. A robotic device following combined transition curves 360 and 370 to go from point P31 to P41 (or vice versa) can continue in the same vertical direction while translating along the horizontal direction.

FIG. 4A shows a portion of roadmap 100 with intersections 134 and 140, in accordance with an example embodiment. As shown in both FIGS. 1 and 4A, intersection 134 is at a point where at least edges 110a and 128a come together at an acute angle and intersection 140 is at a point where at least edges 128a and 112a come together at an obtuse angle. FIG. 4A also indicates that a path from point P5 to point P6 using roadmap 100 would involve use of intersections 134 and 140. As such, a robotic device traveling from P5 to P6 (or vice versa) would likely have to slow down or stop to clear one or both of intersections 134 and 140.

In some examples, intersections of roadmaps can be replaced by transition curves. In the specific example where intersections 134 and 140 could be replaced by respective transition curves, the transition curve replacing intersection 140 could go between a point to the right of point P5 on edge 112a and a point on edge 128a, and the transition curve replacing intersection 134 can go between a point on edge 128a and a point to the right of point P6 on edge 116b.

FIG. 4B shows expanded transition curves 410 and 420 related to respective intersections 140 and 134 shown in FIG. 4A, in accordance with an example embodiment. Transition curve 410 includes curve segments 412, 414, and 416 and transition curve 420 includes curve segments 422, 424, and 426. Transition curves 410 and 420, along with edge 128a, connect a portion of edge 112a starting at point P5 to a portion of edge 110a that ends at point P6.

FIG. 4B shows that a portion of edge 128a is between curve segment 416 of transition curve 410 and curve segment 422 of transition curve 420. In the expanded transition curves 410, 420 shown in FIG. 4B, each junction point is shown using separate junction points for each edge or curve segment that meets another edge or curve segment and with space separating junction points.

Each of curve segments 412, 416, 422, and 426 can be a segment of an Euler spiral. Each of curve segments 414 and 424 can be a circular arc that goes between respective pairs of curve segments 412 and 416 and curve segments 422 and 426. Euler spirals and circular arcs are discussed above in more detail in the context of at least FIG. 2B. Junction points for transition curves 410 and 420 can be determined based on parameters of curve segments, the geometries of intersections 156 and 166 being replaced, and kinematic parameters of robotic devices using transition curves 410 and/or 420, such as discussed above in the context of FIG. 2B.

FIG. 4B shows that transition curves 410 and 420 can depend on the geometry of roadmap 100. For example, edge 128a intersects edge 112a at an obtuse angle while edge 128a intersects edge 110a at an obtuse angle. Correspondingly, the path length of transition curve 410 is longer than the path length of transition curve as transition curve 410 traverses a wider angle between edges than transition curve 420 and an angle subtended by circular curve segment 414 of transition curve 410 is larger than an angle subtended by circular curve segment 424 of transition curve 420. Further, the arc lengths of curve segments 412 and 416 of transition curve 410 are longer than the arc lengths of respective curve segments 422 and 426 of transition curve 420.

FIG. 4C shows curvature graph 430 for transition curves 410 and 420, in accordance with an example embodiment. Curvature graph 430 shows path length on the X axis and curvature on the Y axis, where curvature in a counterclockwise direction is indicated as positive curvature on graph 430 and curvature in a clockwise direction is indicated as negative curvature on graph 430. Graph 430 illustrates curvature for a path beginning at point P5 on edge 112a, taking transition curves 410 and 420 in that order, and ending at point P6 on edge 110a. In graph 430, path length is shown starting at zero corresponding to starting point P5 and increasing until reaching a maximum path length PMax3 corresponding to ending point P6.

Graph 430 indicates that the path from P5 to P6 makes piecewise-continuous changes in curvature along the path length. In particular, graph 430 shows:

a first portion of a path from P5 to P6 with constant zero curvature corresponding to a straight line taken following edge 112a from P5 to a junction point with curve segment 412 of transition curve 410;

a second portion of the path corresponding to transition curve 410 with three sections: a first section with linearly-increasing and positive curvature, a second section with constant positive curvature, and third section with linearly-decreasing but positive curvature, corresponding to the respective portions of the path utilizing the Euler spiral of curve segment 412, the circular arc of curve segment 414, and the Euler spiral of curve segment 416;

a third portion of the path with constant zero curvature, corresponding to a straight line taken following edge 128a from a junction point with curve segment 416 of transition curve 410 to a junction point with curve segment 422 of transition curve 420;

a fourth portion of the path corresponding to transition curve 420 with three sections: a first section with linearly-increasing and positive curvature, a second section with constant positive curvature, and third section with linearly-decreasing but positive curvature, corresponding to the respective portions of the path utilizing the Euler spiral of curve segment 422, the circular arc of curve segment 424, and the Euler spiral of curve segment 426; and a fifth portion of the path with constant zero curvature, corresponding to a straight line taken following edge 110a from a junction point with curve segment 426 of transition curve 420 to point P6.

FIG. 4D shows roadmap 400 with intersections 140 and 134 replaced with respective transition curves 410 and 420, in accordance with an example embodiment. Transition curve 410 includes curve segments 412, 414, and 416 and transition curve 420 includes curve segments 422, 424, and 426.

In the example shown in both FIGS. 4B and 4D, edges 112a and 110a are both in the same horizontal direction. Further, in traveling from point P5 to point P6, transition curve 410 is oriented to curve from a horizontal edge 112a to a diagonal edge 128a, but transition curve 420 is oriented to curve in an opposite fashion from diagonal edge 128a to horizontal edge 110a. A robotic device following combined transition curves 410 and 420 can make a 180° turn to go from P5 to P6 (or vice versa), thus both reversing horizontal direction and translating along a vertical direction; i.e., make a U turn. In other examples, combinations of transition curves can be used to make U turns in other orientations; e.g., by reversing vertical direction while translating horizontally.

A robotic device can be provided with or otherwise obtain roadmap 400 and subsequently be directed to travel from point P5 to point P6 (or vice versa) via transition curves 410 and 420; e.g., as part or all of a route used by the robotic device to carry out a task. Also, the robotic device using roadmap 400 to travel from P5 to P6 (or vice versa) can take transition curves 410 and 420 to avoid stopping at and/or slowing down for one or more intersections along the way, such as intersection(s) 134 and/or 140 of roadmap 100.

Figure 5A:
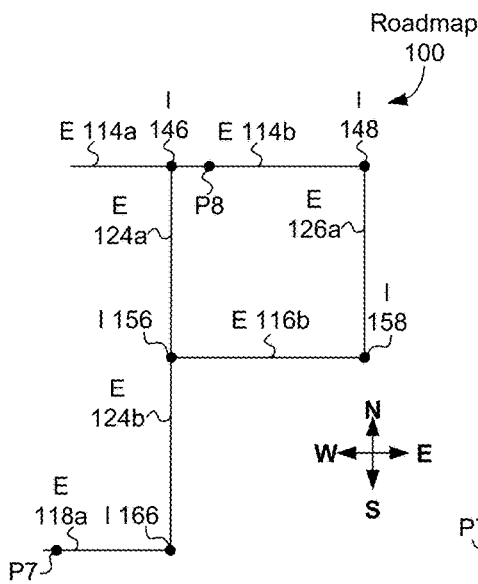
FIG. 5A shows a portion of the roadmap of FIG. 1 with five intersections, in accordance with an example embodiment.

FIG. 5A shows a portion of roadmap 100 including intersections 146, 148, 156, 158, and 166 in accordance with an example embodiment. As shown in both FIGS. 1 and 5A, intersection 146 is at a point where at least edges 114a, 114b, and 124a come together, intersection 148 is at a point where at least edges 114b and 126a come together, intersection 156 is at a point where at least edges 116b and 124b come together, intersection 158 is at a point where at least edges 116b and 126a come together, and intersection 166 is at a point where at least edges 118b and 124b come together. FIG. 5A also indicates that a path from point P7 to point P8 using roadmap 100 can involve use of intersections 166, 156, 158, and 148. As such, a robotic device traveling from P7 to P8 (or vice versa) would likely have to slow down or stop to clear one or more of intersections 166, 156, 158, and 148.

In some examples, intersections of roadmaps can be replaced by transition curves. In the specific example where intersections 148, 156, 158, and 166 could be replaced by respective transition curves, the transition curves can replace these intersections. For example, a transition curve replacing intersection 166 could go between a point to the right of point P7 on edge 118a and a point on edge 124b, a transition curve replacing intersection 156 could go between a point on edge 124b and a point on edge 116b, a transition curve replacing intersection 158 could go between a point on edge 116b and a point on edge 126a, and a transition curve replacing intersection 148 could go between a point on edge 126a and a point on edge 114b to the right of point P8.

Figure 5B:
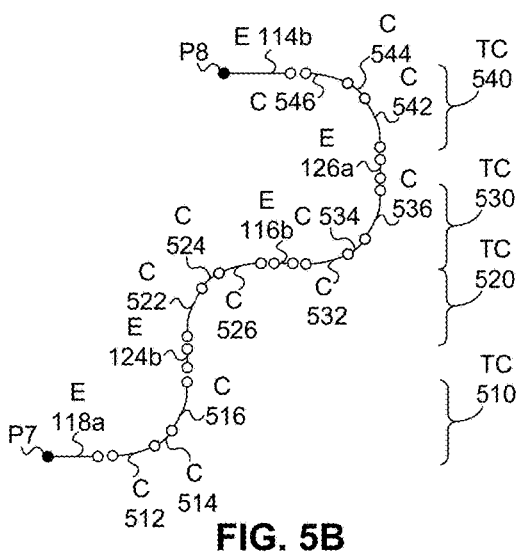
FIG. 5B shows four expanded transition curves related to the intersections shown in FIG. 5A, in accordance with an example embodiment.

FIG. 5B shows expanded transition curves 510, 520, 530, and 540 related to respective intersections 166, 156, 158, and 148 shown in FIG. 5A, in accordance with an example embodiment. Transition curve 510 includes curve segments 512, 514, and 516, transition curve 520 includes curve segments 522, 524, and 526, transition curve 530 includes curve segments 532, 534, and 536, and transition curve 540 includes curve segments 542, 544, and 546. Transition curves 510, 520, 530, and 540, along with edges 124b, 116b, and 126a, connect a portion of edge 118a starting at point P7 to a portion of edge 114b that ends at point P8.

FIG. 5B shows that a portion of edge 124b is between curve segment 516 of transition curve 510 and curve segment 522 of transition curve 520, a portion of edge 116b is between curve segment 526 of transition curve 520 and curve segment 532 of transition curve 530, and a portion of edge 126a is between curve segment 536 of transition curve 530 and curve segment 542 of transition curve 540. In the expanded transition curves 510, 520, 530, and 540 shown in FIG. 5B, each junction point is shown using separate junction points for each edge or curve segment that meets another edge or curve segment and with space separating junction points.

Each of curve segments 512, 516, 522, 526, 532, 536, 542, and 546 can be a segment of an Euler spiral. Each of curve segments 514, 524, 534, and 544 can be a circular arc that goes between respective pairs of curve segments 512 and 516, curve segments 522 and 526, curve segments 532 and 536, and curve segments 542 and 546. Euler spirals and circular arcs are discussed above in more detail in the context of at least FIG. 2B. Junction points for transition curves 510, 520, 530, and 540 can be determined based on parameters of curve segments, the geometries of intersections 146, 148, 156, and 158 being replaced, and kinematic parameters of robotic devices using transition curves 510, 520, 530, and/or 540, such as discussed above in the context of FIG. 2B.

Figure 5C:
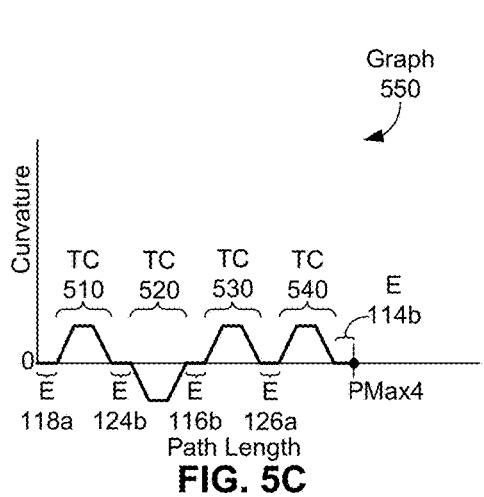
FIG. 5C shows a curvature graph for the transition curves of FIG. 5B, in accordance with an example embodiment.

FIG. 5C shows curvature graph 550 for transition curves 510, 520, 530, and 540, in accordance with an example embodiment. Curvature graph 550 shows path length on the X axis and curvature on the Y axis, where curvature in a counter-clockwise direction is indicated as positive curvature on graph 550 and curvature in a clockwise direction is indicated as negative curvature on graph 550. Graph 550 illustrates curvature for a path beginning at point P7 on edge 118a, taking transition curves 510, 520, 530, 540 in that order, and ending at point P8 on edge 114b. In graph 550, path length is shown starting at zero corresponding to starting point P7 and increasing until reaching a maximum path length PMax4 corresponding to ending point P8.

Graph 550 indicates that the path from P7 to P8 makes piecewise-continuous changes in curvature along the path length. In particular, graph 550 shows:

a first portion of a path from P7 to P8 with constant zero curvature corresponding to a straight line taken following edge 118*a* from P7 to a junction point with curve segment 512 of transition curve 510;

a second portion of the path corresponding to transition curve 510 with three sections: a first section with linearly-increasing and positive curvature, a second section with constant positive curvature, and third section with linearly-decreasing but positive curvature, corresponding to the respective portions of the path utilizing the Euler spiral of curve segment 512, the circular arc of curve segment 514, and the Euler spiral of curve segment 516;

a third portion of the path with constant zero curvature, corresponding to a straight line taken following edge 124*b* from a junction point with curve segment 516 of transition curve 510 to a junction point with curve segment 522 of transition curve 520;

a fourth portion of the path corresponding to transition curve 520 with three sections: a first section with linearly-decreasing and negative curvature, a second section with constant negative curvature, and third section with linearly-increasing but negative curvature, corresponding to the respective portions of the path utilizing the Euler spiral of curve segment 522, the circular arc of curve segment 524, and the Euler spiral of curve segment 526;

a fifth portion of the path with constant zero curvature, corresponding to a straight line taken following edge 116*b* from a junction point with curve segment 526 of transition curve 520 to a junction point with curve segment 532 of transition curve 530;

a sixth portion of the path corresponding to transition curve 530 with three sections: a first section with linearly-increasing and positive curvature, a second section with constant positive curvature, and third section with linearly-decreasing but positive curvature, corresponding to the respective portions of the path utilizing the Euler spiral of curve segment 532, the circular arc of curve segment 534, and the Euler spiral of curve segment 536;

a seventh portion of the path with constant zero curvature, corresponding to a straight line taken following edge 126*a* from a junction point with curve segment 536 of transition curve 530 to a junction point with curve segment 542 of transition curve 540;

an eighth portion of the path corresponding to transition curve 540 with three sections: a first section with linearly-increasing and positive curvature, a second section with constant positive curvature, and third section with linearly-decreasing but positive curvature, corresponding to the respective portions of the path utilizing the Euler spiral of curve segment 542, the circular arc of curve segment 544, and the Euler spiral of curve segment 546; and a ninth portion of the path with constant zero curvature, corresponding to a straight line taken following edge 114*b* from a junction point with curve segment 546 of transition curve 540 to point P8.

Figure 5D:
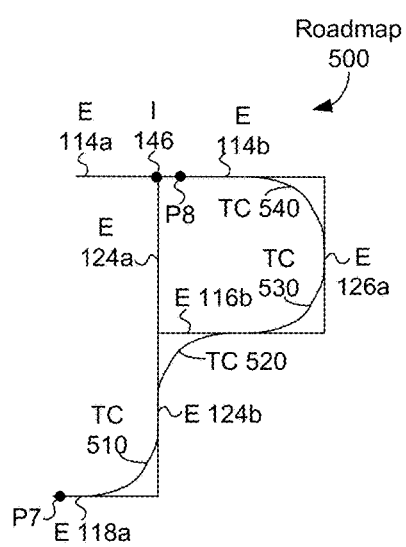
FIG. 5D shows a roadmap with the intersections of FIG. 5A replaced with the transition curves of FIG. 5B, in accordance with an example embodiment.

FIG. 5D shows roadmap 500 with intersections 166, 156, 158, and 148 replaced with respective transition curves 510, 520, 530, and 540, in accordance with an example embodiment. Transition curve 510 includes curve segments 512, 514, and 516, transition curve 520 includes curve segments 522, 524, and 526, transition curve 530 includes curve segments 532, 534, and 536, and transition curve 540 includes curve segments 542, 544, and 546.

In the example shown in both FIGS. 5B and 5D, edges 114*b*, 116*b*, and 118*a* are all oriented in the same horizontal direction, while edges 124*b* and 126*a* are both oriented in the same vertical direction. Further, in traveling from point P7 to point P8, each of transition curves 510 and 530 is oriented to curve in a horizontal-to-vertical fashion, but each of transition curves 520 and 540 is oriented to curve in an opposite vertical-to-horizontal fashion. A robotic device following combined transition curves 510, 520, 530, and 540 can make a 180° turn to go from P7 to P8 (or vice versa), as well as translating in horizontal and vertical directions.

A robotic device can be provided with or otherwise obtain roadmap 500 and subsequently be directed to travel from point P7 to point P8 (or vice versa) via transition curves 510, 520, 530, and 540; e.g., as part or all of a route used by the robotic device to carry out a task. Also, the robotic device using roadmap 500 to travel from P7 to P8 (or vice versa) can take transition curves 510, 520, 530, and 540 to avoid stopping at and/or slowing down for one or more intersections along the way, such as intersection(s) 148, 156, 158, and/or 166 of roadmap 100.

Figure 6:
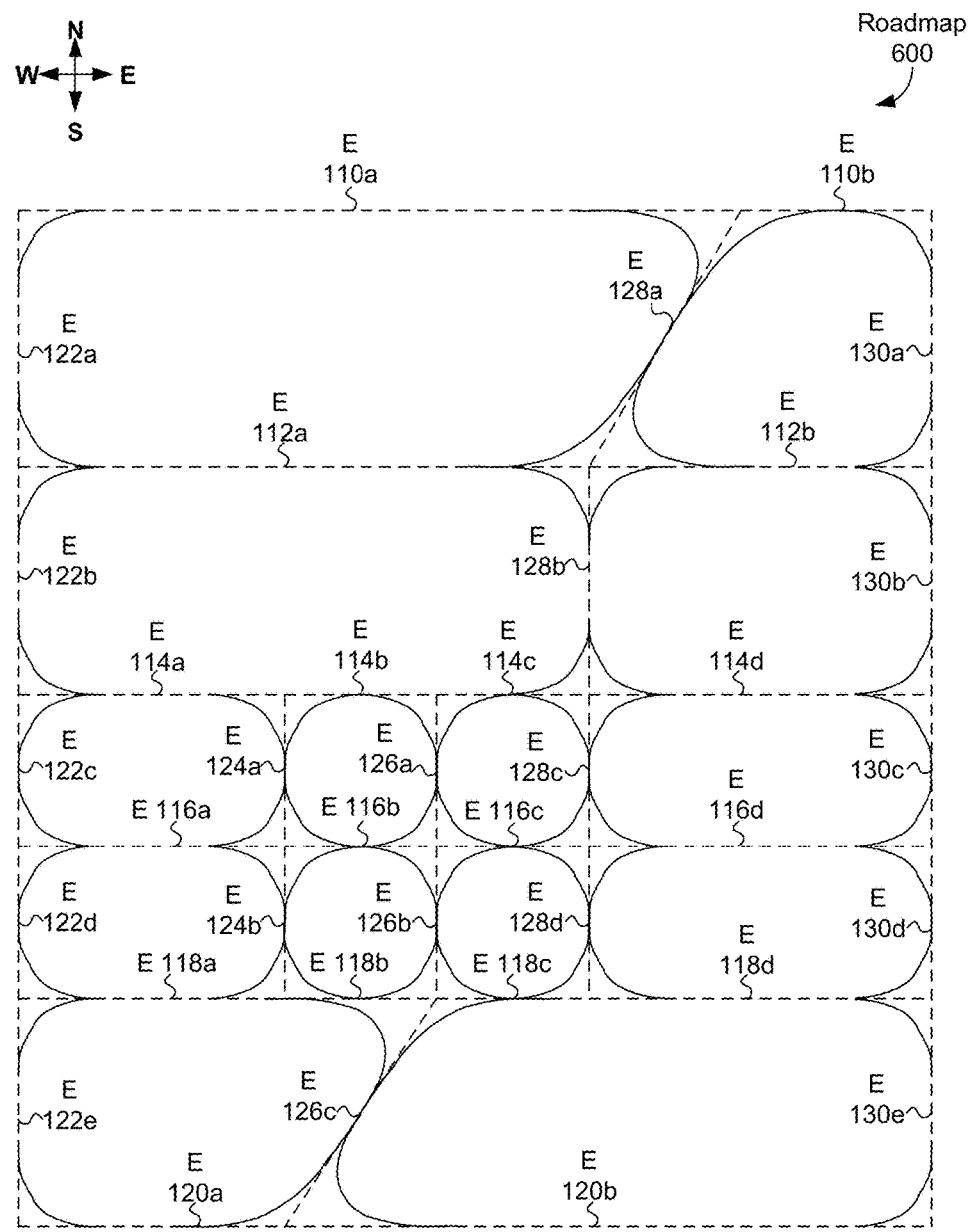
FIG. 6 shows the roadmap of FIG. 1 with intersections replaced with transition curves, in accordance with an example embodiment.

FIG. 6 shows roadmap 600 related to roadmap 100, in accordance with an example embodiment. Robotic devices can travel an environment mapped using roadmap 600 using routes that allow various horizontal translations, vertical translations, and rotations by taking one or more edges and/or transition curves, where the transition curves may have different orientations (e.g., horizontal-to-vertical or vertical-to-horizontal).

In particular, roadmap 600 is a map of the same environment mapped by roadmap 100, but the intersections of roadmap 100 have been replaced by transition curves in roadmap 600. As such, roadmap 600 indicates that a wide variety, if not all, intersections in a roadmap, such as roadmap 100, can be replaced by transition curves. A robotic device using roadmap 600 can take one or more transition curves of roadmap 600 to reduce the time to stop at and/or slowing down for intersections, such intersections 132-178 of roadmap 100. Thus, by reducing the time to stop and/or slow down at intersections, a robotic device using roadmap 600 can be more efficient that a similar robotic device using roadmap 100.

In some embodiments, complex planning software; e.g., multiple agent planning software, can be used at or near intersections where multiple agents, such as robotic devices and human operators, are likely to be interact. In these interactions, simpler planning software; e.g., single agent planning software, can be used in areas where the complex planning software is not used. Then, by using roadmap 600 without intersections, the use of such complex planning software can be reduced in comparison to roadmap 100 that has multiple intersections. Further, reducing use of complex planning software can lead to lower computational resource usage, less time consumed for robotic planning, and a consequent lower likelihood of collisions between agents.

Figure 7:
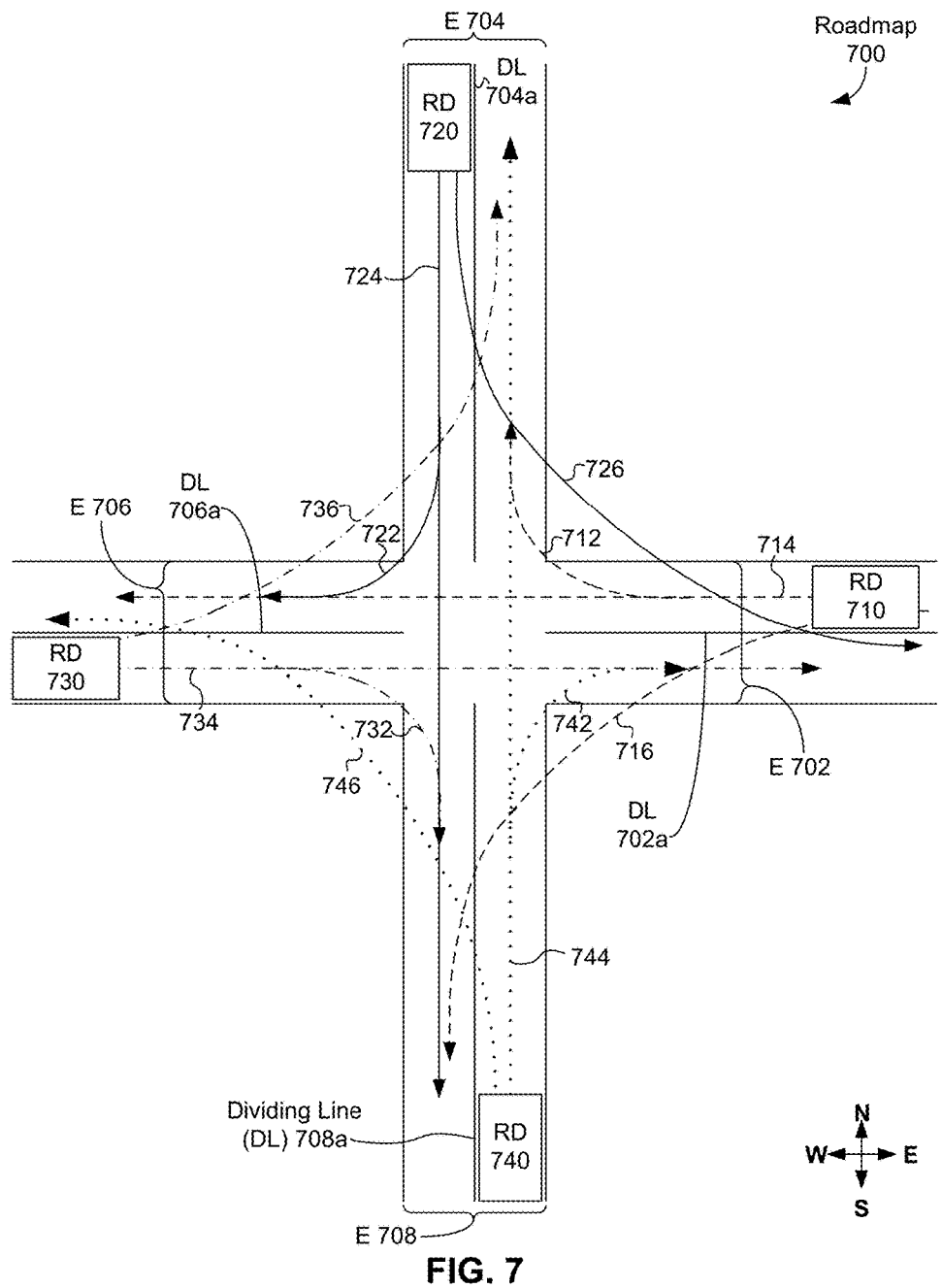
FIG. 7 shows a directed roadmap, in accordance with an example embodiment.

FIG. 7 shows roadmap 700, in accordance with an example embodiment. Roadmap 700 represents an environment modeled by using at least four undirected edges: 702, 704, 706, and 708. Roadmap 700 can be used by at least mobile robotic devices 710, 720, 730, and 740 to travel on and between edges 702, 704, 706, and 708. In the example shown in robotic device 710 is traveling in a portion of the environment represented by edge 702, robotic device 710 is traveling in a portion of the environment represented by edge 704, robotic device 730 is traveling in a portion of the environment represented by edge 706, and robotic device 740 is traveling in a portion of the environment represented by edge 708.

Roadmap 700 includes directed edges 712, 714, 716, 722, 724, 726, 732, 734, 736, 742, 744, and 746, shown with arrows in FIG. 7, indicating pathways robotic devices can use to travel in the environment represented by roadmap 700. A directed edge (e.g., one of directed edges 712, 714, 716, 722, 724, 726, 732, 734, 736, 742, 744, and 746) can be an edge associated with a specified direction. In contrast, an undirected edge (e.g., one of undirected edges 702, 704, 706, and 708) is not associated with a direction. For example, a directed edge A1A2 connecting point A1 with point A2 can be associated with a direction specified as going from point A1 to point A2. Then, the directed edge A1A2 can be used to go from A1 to A2 but cannot be used to go in the opposite direction from A2 to A1. However, an undirected edge UE1 connecting A1 and A2 can be used to go from A1 to A2 or from A2 to A1.

Figure 8:
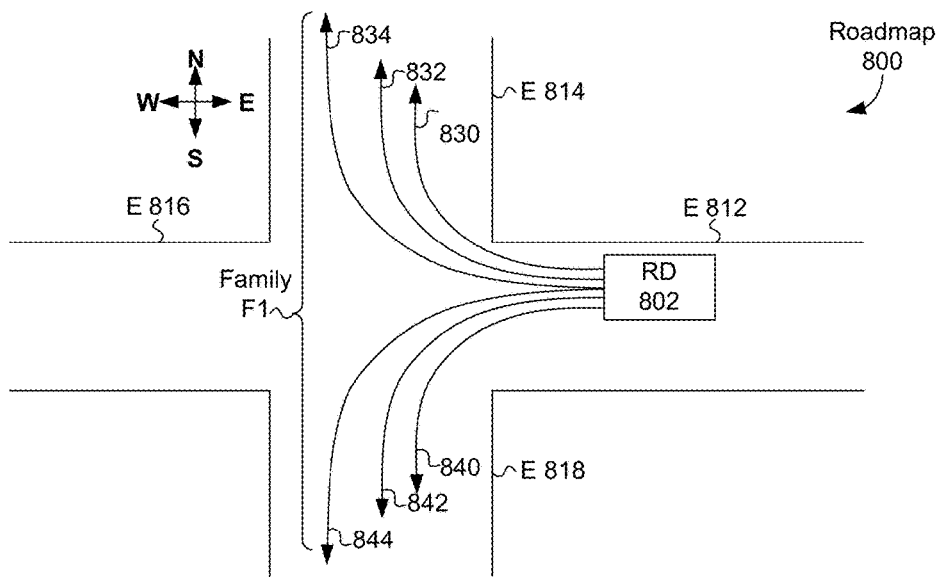
FIG. 8 shows a family of directed edges of a roadmap for one type of robotic device, in accordance with an example embodiment.

Directed edges 712, 714, and 716 start at edge 702 and end at respective edges 704, 706, and 708. Directed edges 722, 724, and 726 start at edge 704 and end at respective edges 706, 708, and 702. Directed edges 732, 734, and 736 start at edge 706 and end at respective edges 708, 702, and 704. Directed edges 742, 744, and 746 start at edge 708 and end at respective edges 702, 704, and 706. In FIG. 8, directed edges 712, 714, and 716 originating within edge 702 are shown with dashed lines, directed edges 722, 724, and 726 originating within edge 704 are shown with solid lines, directed edges 732, 734, and 736 originating within edge 706 are shown with dashed-and-dotted lines and directed edges 742, 744, and 746 originating within edge 708 are shown with dotted lines.

Directed edges 712, 722, 732, and 742 can be used by respective robotic devices 710, 720, 730, and 740 to take a right turn from respective edges 702, 704, 706, and 708 to the right side (from the robotic device's point of view) of respective edges 704, 706, 708, and 702. Directed edges 716, 726, 736, and 746 can be used by respective robotic devices 710, 720, 730, and 740 to take a left turn from respective edges 702, 704, 706, and 708 to the right side (from the robotic device's point of view) of respective edges 708, 702, 704, and 706.

Roadmap 700 includes directed edges 712, 716, 722, 726, 732, 736, 742, and 746 that utilize transition curves. Each of the transition curves of directed edges 712, 716, 722, 726, 732, 736, 742, and 746 is made up of three curve segments, including two Euler spiral curve segments separated by a circular arc curve segment, such as discussed in the context of at least FIGS. 2A-5D.

Directed edges 712-746 can be part of a route provided to a robotic device to complete a task using roadmap 700. For example, routes using roadmap 700 can involve bidirectional lanes of travel by having two edges with opposite directions of travel sharing the same start and endpoints. FIG. 7 shows that each of edges 702, 704, 706, and 708 are divided by respective dividing lines 702a, 704a, 706a, and 708a into two portions.

Each of robotic devices 710, 720, 730, and 740 are on the right side of each respective dividing line 702a, 704a, 706a, and 708a to indicate that the robotic device is traveling on the right side of respective edges 702, 704, 706, and 708 from the robotic device's point of view. Then, if one of robotic devices 710, 720, 730, and 740 continues in a straight line, the robotic device will remain on the right side of an edge from its point of view. For example, if robotic device 710 on edge 702 were to travel in a straight line (west) from edge 702 onto edge 706; e.g., using directed edge 714, robotic device 710 will be on the right side of edge 706 from robotic device 710's point of view. Also, robotic device 730 on edge 706 were to travel in a straight line (east) from edge 706 onto edge 702, e.g., using directed edge 734, robotic device 730 will be on the right side of edge 702 from robotic device 730's point of view. Similar observations can be made for robotic devices 720 and 740 taking respective paths 724 and 744 from the right side (from the respective robotic device's point of view) of edges 704 and 708 to the right side of respective edges 708 and 704.

In some embodiments, roadmap 700 can be provided to one or more of robotic devices 710, 720, 730, and 740 and the robotic device(s) can be directed to use roadmap 700 to take one or more of directed edges 712, 714, 716, 722, 724, 726, 732, 734, 736, 742, 744, and 746 that include transition curves to travel between edges 702, 704, 706, and 708.

FIG. 8 shows a family of directed edges 830, 832, 834, 840, 842, and 844 of roadmap 800 for one type of robotic device exemplified by robotic device 802, in accordance with an example embodiment. Roadmap 800 includes undirected edges 812, 814, 816, and 818 with vertical undirected edges 814 and 818 meeting horizontal undirected edges 812 and 816.

Roadmap 800 includes family of directed edges F1 that can include directed edges 830, 832, 834, 840, 842, and 844, where each of the directed edges in family F1 includes a transition curve. Each of the transition curves in family F1 is made up of three curve segments, including two Euler spiral curve segments separated by a circular arc curve segment, such as discussed in the context of at least FIGS. 2A-5D.

Family of directed edges F1 can include edges for different configurations of a corresponding type T1 of robotic device; e.g., utilizing different equipment, carrying differing amounts of cargo, operating at different speeds, etc. For example, directed edge 830 can be used by robotic device 802 to go from undirected edge 812 to undirected edge 814 (i.e., make a right turn from edge 812 to edge 814) when robotic device 802 is configured using configuration C1 for type T1/robotic device 802. Corresponding directed edge 840 can be used by robotic device 802 to go from undirected edge 812 to undirected edge 818 (i.e., make a left turn from edge 812 to edge 818) when robotic device 802 is configured using configuration C1. Configuration C1 for type T1/robotic device 802 can involve a robotic device of type T1, e.g., robotic device 802, carrying little or no cargo, not utilizing equipment that increases a minimum turning radius of the robotic device and/or can operate at a relatively wide range of speeds, velocities, and accelerations leading to tight cornering performance and so involve use of relatively-tightly-cornered edges 830 and 840.

Directed edges 832 and 842 can be used by robotic device 802 to go from undirected edge 812 to respective undirected edges 814 and 818 when robotic device 802 is configured using configuration C2. Configuration C2 for type T1/robotic device 802 can involve a robotic device of type T1, e.g., robotic device 802, carrying a relatively-moderate amount of cargo, utilizing equipment that somewhat increases a minimum turning radius of the robotic device and/or can operate at relatively moderate range of speeds, velocities, and accelerations leading to moderate cornering performance and so involve use of relatively-moderately-cornered edges 832 and 842.

Directed edges 834 and 844 can be used by robotic device 802 to go from undirected edge 812 to respective undirected edges 814 and 818 when robotic device 802 is configured using configuration C3. Configuration C3 for type T1/robotic device 802 can involve a robotic device of type T1, e.g., robotic device 802, carrying a relatively-large amount of cargo, utilizing equipment that increases a minimum turning radius of the robotic device and/or can operate at relatively narrow range of speeds, velocities, and accelerations leading to relatively-wide cornering and so involve use of relatively-widely-cornered edges 834 and 844.

In some embodiments, roadmap 800 can be provided to robotic device 802. Then, robotic device 802 can be directed to use roadmap 800 to take one or more of directed edges 830, 832, 834, 840, 842, 844 that include transition curves to travel between edge 812 and edge 814 and/or 818.

Many other families of directed edges and/or configurations one or more types of robotic devices (e.g., type T1) and/or one or more specific robotic devices (e.g., robotic device 802) are possible as well.

Figure 9:
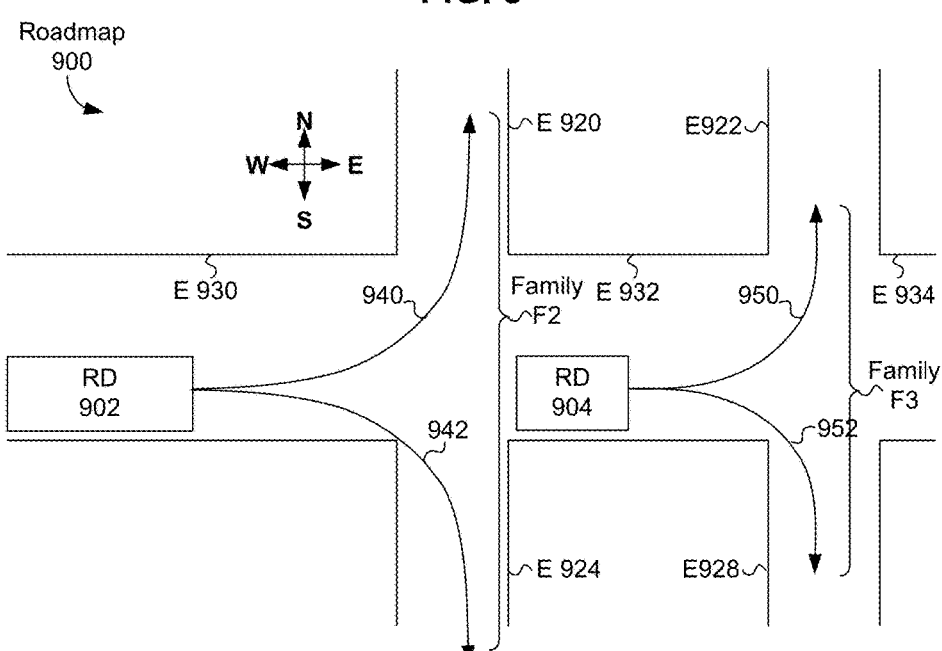
FIG. 9 shows two families of directed edges of another roadmap for two types of robotic devices in accordance with an example embodiment.

FIG. 9 shows two families of directed edges F2 and F3 of roadmap 900 for two types of robotic devices exemplified by respective robotic devices 902 and 904, in accordance with an example embodiment. Roadmap 900 includes vertical undirected edges 920, 922, 924, and 928 that meet at right angles with horizontal undirected edges 930, 932, and 934.

Roadmap 900 includes family of directed edges F2 having directed edges 940 and 942 and family of directed edges F3 having directed edges 950 and 952. FIG. 9 indicates that family of directed edges F2 is associated with a type T2 of robotic devices exemplified by robotic device 902 and that family of directed edges F3 is associated with a type T3 of robotic devices exemplified by robotic device 904.

Type T2 robotic devices can have different operational parameters than type T3 robotic devices. In the example shown in FIG. 9, example, type T2 robotic devices can have wider minimum turning radii than type T3 robotic devices. Also, type T2 and type T3 robotic devices can have other different operational parameters, such as but not limited to, differing kinematic parameters, e.g., maximum and/or minimum speeds, velocities, acceleration, and/or jerk (derivative of acceleration) values, cargo capacity and/or actual cargo weight/mass values, one or more masses of the robotic device, one or more weights of the robotic device and one or more coefficients of friction for the robotic device, additional performance parameters/characteristics, different weights/masses, different parameters for and/or types of propulsion, and different parameters and/or actuators for movement.

As such, type T2 robotic devices can use different transition curves than type T3 robotic devices when performing tasks in an environment represented by roadmap 900. For example, type T2 robotic devices can use family of directed edges F2 including directed edges 940 and 942 making respective left and right turns, and type T3 robotic devices can use family of directed edges F3 including directed edges 950 and 952 making respective left and right turns. FIG. 9 shows that edges in family of directed edges F2 involve wider corners than family of directed edges F3, which can be based on the wider minimum turning radii of type T2 robotic devices than the minimum turning radii of type T3 robotic devices. In some embodiments, one or more families of directed edges for one or more respective types of robotic devices can include edges for different configurations of a corresponding type of robotic devices such as discussed above in the context of FIG. 8.

In other embodiments, roadmap 900 can be provided to robotic devices 902 and/or 904. Then, robotic devices 902 and/or 904 can be directed to use roadmap 900 to take one of directed edges 940 and 942 to travel between edge 930 and either edge 920 or edge 924 and/or to take one of directed edges 950 and 952 to travel between edge 932 and either edge 922 or edge 928.

Figure 10A:
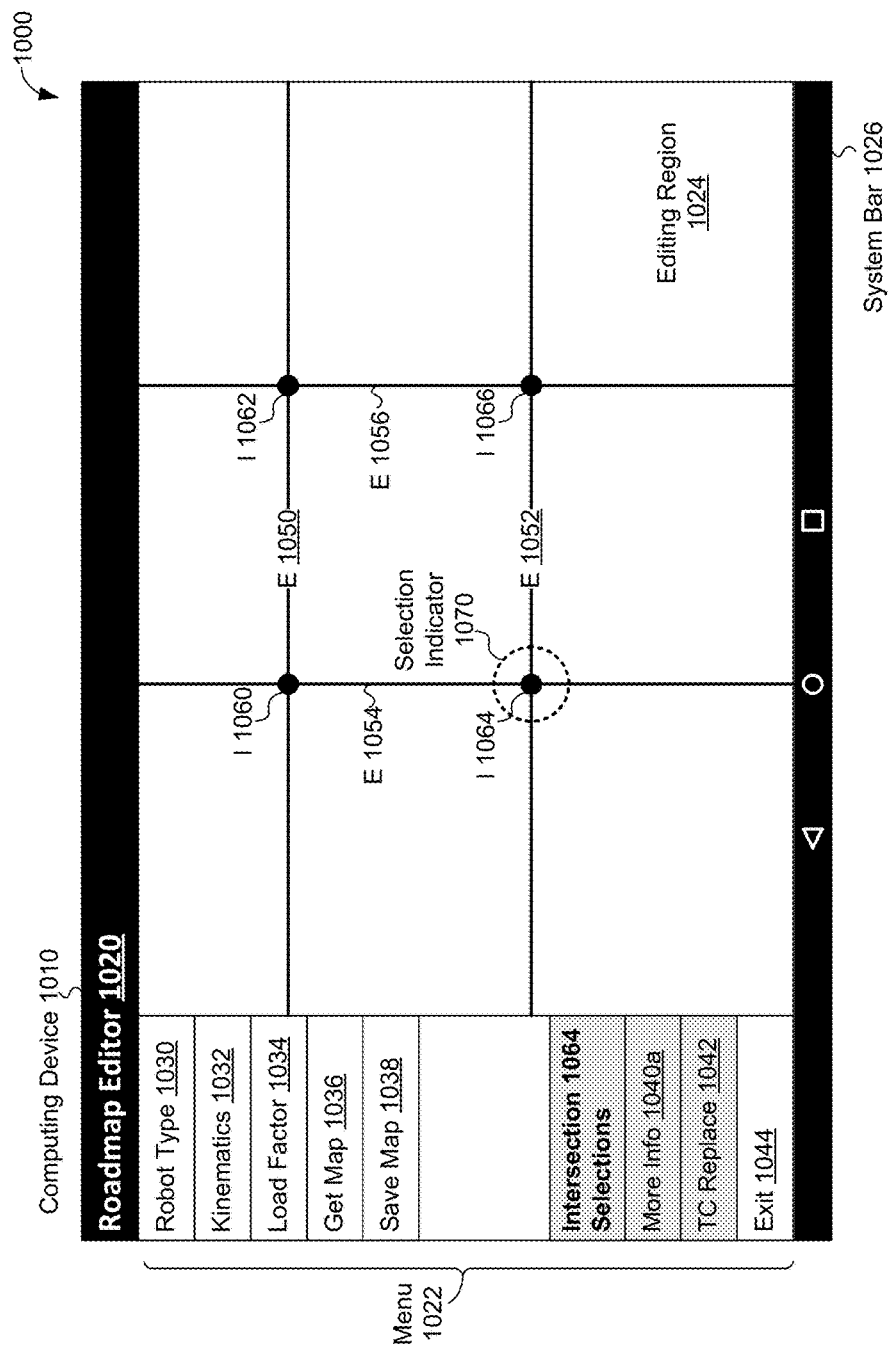
FIGS. 10A and 10B depict a user interface of a computing device configured for roadmap design, in accordance with an example embodiment.
Figure 10B:
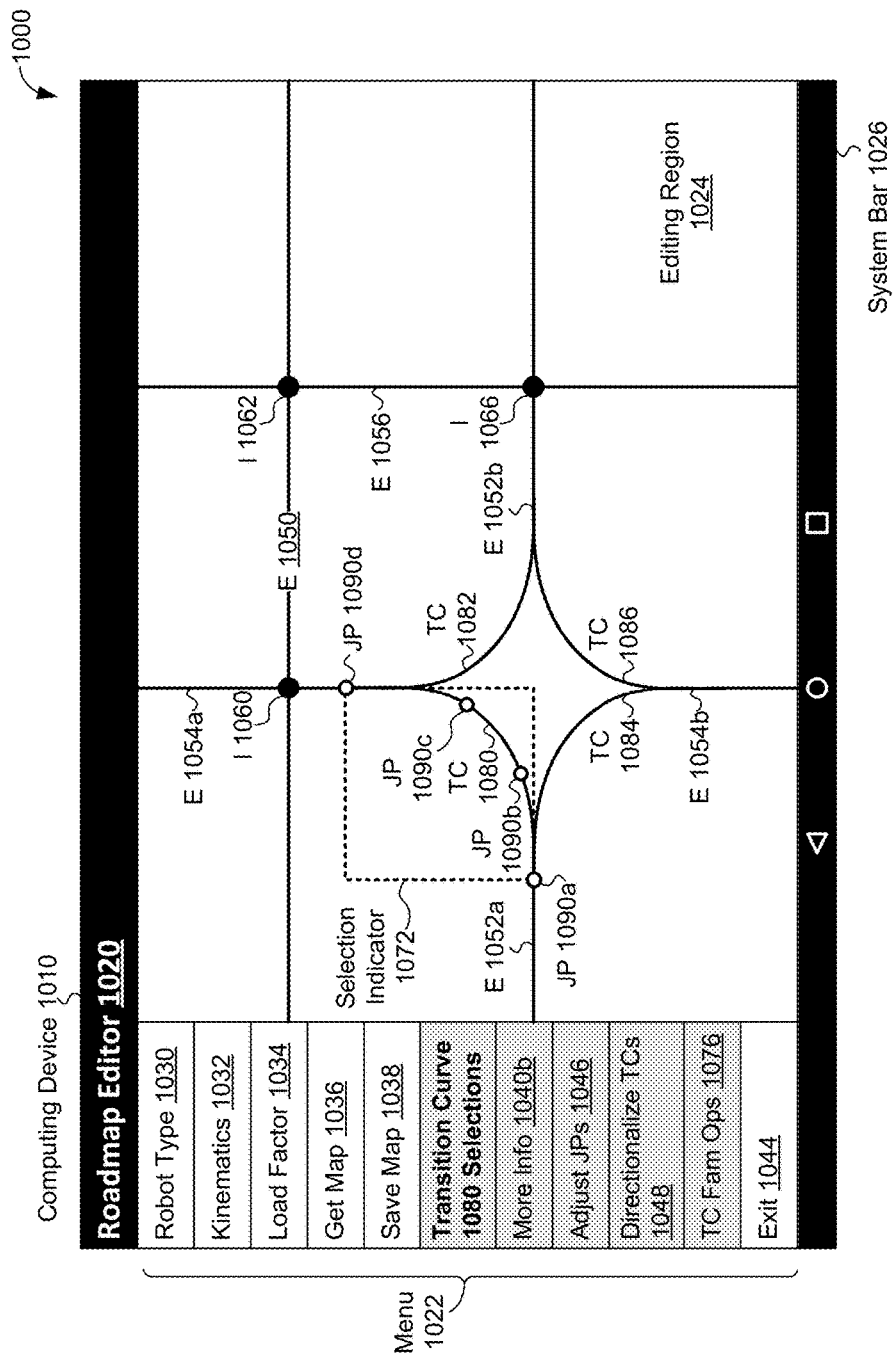

FIGS. 10A and 10B depict scenario 1000 where a user interface of computing device 1010 is utilized for roadmap design, in accordance with an example embodiment. During scenario 1000, the user interface is used to select an intersection of a previously-loaded roadmap and replace the selected intersection with transition curves.

FIG. 10A illustrates the user interface provided by computing device 1010 as roadmap editor 1020. Roadmap editor 1020 includes menu 1022, editing region 1024, and system bar 1026. Menu 1022 lists a number of selections related to a roadmap, such as the previously-loaded roadmap shown displayed in editing region 1024, where a selection of menu 1022, when chosen, can cause roadmap editor 1020 to perform one or more operations related to the chosen selection.

FIG. 10A shows that menu 1022 includes robot type selection 1030, kinematics selection 1032, load factor selection 1034, get map selection 1036, save map selection 1038, more information selection 1040a, replace intersection 1042, and exit selection 1044. In other embodiments than those shown in FIGS. 10A and 10B, menu 1022 can provide more, fewer, and/or different menu selections. In still other embodiments, other graphical elements, such as pull-down menus, icons, and/or dialogs can be used with and/or replace one or more selections of menu 1022.

Robot type selection 1030 can be used to specify, review, update, and/or delete an association between a class or type of robotic device and the roadmap. For example, types T2 and T3 robots are associated with roadmap 900 as discussed above in the context of FIG. 9. Then, if roadmap 900 were being edited using roadmap editor 1020, robot type selection 1030 can make the association between type T2 and T3 robots and roadmap 300.

Kinematics selection 1032 can be used to specify, review, update, and/or delete one or more kinematic parameters related to motion or kinematics of a robotic device associated with part or all of the roadmap. Example kinematic parameters include, but are not limited to, parameters related to: maximum and/or minimum velocity or speed of a robotic device, maximum and/or minimum acceleration for the robotic device, maximum and/or minimum jerk (derivative of acceleration) for the robotic device, one or more masses of the robotic device, one or more weights of the robotic device, cargo capacity, and one or more coefficients of friction for the robotic device. In some embodiments, some or all of the kinematic parameters can be specified for a robotic device by specifying a type of the robotic device using robot type selection 1030.

In other embodiments, kinematic parameters can be specified for a portion of the roadmap; e.g., one or more kinematic parameters specified for one or more particular intersections, edges, transition curves. The portion-specific parameters can replace and/or augment one or more kinematic parameters specified for all intersections, edges, edge interaction regions, and/or edge non-interaction regions. For example, a robot of type T1 can have a maximum velocity of V1 meters per second (m/s), and so associating robots of type T1 with the roadmap can set the maximum velocity for type T1 robots using the roadmap at V1 m/s. Then, roadmap editor 1030 can be used to set a maximum velocity for all intersections and transition curves of the roadmap to be V2 m/s, where V2 is less than V1, and to set a maximum velocity for a particular transition curve TC1 to be V3 m/s, where V3 is less than V2. Then, a type T1 robotic device using this roadmap can be instructed to have a maximum velocity of: V1 m/s in edges other than transition curves, V2 m/s in intersections and most transition curves, and V3 on transition curve TC1. In still other embodiments, other related parameters, such as, but not limited to, performance parameters/characteristics, different weights/masses, different parameters related to propulsion of the robotic device, and different parameters and/or actuators for movement, can be specified using kinematics selection 632. Many other examples are possible as well. Many other examples are possible as well.

Load factor selection 1034 can be used to specify a load factor, which can be an amount of cargo weight and/or mass planned for and/or actually carried by a robotic device while moving in an environment modeled by the roadmap. The load factor can be specified for a particular robotic device, a particular type of robotic device, and/or for part or all of a roadmap, such as discussed above in the context of kinematic selection 1032. In some embodiments, one or more load factors can be specified as one or more kinematic parameters using kinematic selection 1032.

Get map selection 1036 can be used to retrieve a roadmap from data storage and load the retrieved roadmap into roadmap editor 1020. Save map selection 1038 can be used to store a roadmap currently loaded into roadmap editor 1020 to data storage. For example, a roadmap can be stored in non-volatile data storage as one or more files, where non-volatile data storage is discussed below in the context of data storage 1104 of FIG. 11A. Exit selection 1044 can be used to terminate execution of roadmap editor 1020; e.g., exit an application for roadmap editor 1020.

Editing region 1024 can be used to create, review, and update roadmaps. For example, roadmaps can be updated by creating, reviewing, updating, and/or deleting edges and/or intersections of a roadmap displayed in editing region 1024. After creating, reviewing, and/or updating a roadmap, the roadmap can be saved to data storage for later use; e.g., using save map selection 1038.

System bar 1026 shows a triangle, circle, and square, which can be used to return to a previous application executed prior to roadmap editor 1020 by selecting the triangle, return to a home screen by selecting the circle, and provide a listing of all executed applications by selecting the square. Graphical elements, such as a selection of menu 1022, edges, intersections, transition curves, curve segments, and junction points of roadmaps shown in editing region 1024, and the triangle, circle, and square of system bar 1026, can be selected using a user input device of computing device 1010. Example user input devices are described below in the context of user interface module 1101 shown in FIG. 11A.

In scenario 1000, roadmap editor 1020 has loaded and displayed a roadmap, which is shown in part in editing region 1024 of FIG. 10A. The roadmap includes edges 1052, 1054, 1056, and 1058 and intersections 1060, 1062, 1064 and 1066. FIG. 10A shows that edges 1052 and 1054 are horizontal edges, edges 1056 and 1058 are vertical edges, intersection 1060 is at a point where edges 1052 and 1056 come together, intersection 1062 is at a point where edges 1052 and 1056 come together, intersection 1064 is at a point where edges 1054 and 1056 come together, and intersection 1066 is at a point where edges 1054 and 1058 come together.

Scenario 1000 continues with a selection of intersection 1064. After intersection 1064 is selected, roadmap editor 1020 can generate and display selection indicator 1070 surrounding intersection 1064 to confirm that intersection 1064 has been selected. Roadmap editor 1020 can also update menu 1022 upon selection of intersection 1064 to add operations related to selected intersection 1064.

FIG. 10A shows that menu 1022 includes "Intersection 1064 Selections" that include more information selection 1040a and transition curve replace selection 1042. In other embodiments, roadmap editor 1020 can add more, fewer, and/or different selections to menu 1022 for operations related to a selected intersection.

More information selection 1040a can be used to display additional data about intersection 1064—the additional data can include, but is not limited to, specific location information such as latitude/longitude coordinates for the intersection, kinematic and/or other parameters associated with the intersection, one or more names or labels associated with the intersection (e.g., "SlickFloor1"), and comments/notes for the intersection (e.g., "floor can be slick at this intersection"). In some embodiments, more information selections 1040a and/or 1040b can be used for updating, deleting, and/or inserting data as well as displaying data.

Transition curve replace selection 1042 can be used to instruct roadmap editor 1020 to updated a displayed roadmap by one or more selected intersections with one or more transition curves. In scenario 1000, transition curve replace selection 1042 is chosen to replace selected intersection 1064 with transition curves. In response, roadmap editor 1020 updates a display of the roadmap provided in editing region 1024 to replace selected intersection 1064 with four transition curves.

FIG. 10B shows roadmap editor 1020 after updating the roadmap to replace selected intersection 1064. In scenario 1000, roadmap editor 1020 replaces intersection 1064 with four transition curves 1080, 1082, 1084, and 1086 and updates edges 1052 and 1054 that previously crossed at intersection 1064. FIG. 10B shows that roadmap editor 1020 has divided previous horizontal edge 1052 into two smaller edges: horizontal edge 1052a that is to the left of transition curve 1080 and horizontal edge 1052b that is to the right of transition curve 1082. Roadmap editor 1020 also has divided previous vertical edge 1054 into two smaller edges: vertical edge 1054a that is above transition curves 1080 and 1082, and vertical edge 1054b that is below transition curves 1084 and 1086.

FIG. 10B further shows that transition curve 1080 connects edges 1052a and 1054a, transition curve 1082 connects edges 1052b and 1054a, transition curve 1084 connects edges 1052a and 1054b, and transition curve 1080 connects edges 1052b and 1054b. Each of transition curves 1080-1086 is made up of three curve segments, including two Euler spiral curve segments separated by a circular arc curve segment, such as discussed in the context of at least FIGS. 2A-5D. For example, transition curve 1080 is shown with junction points 1090b and 1090c where curve segments of transition curve 1080 come together and with junction points 1090a and 1090d where transition curve 1080 comes together with respective edges 1052a and 1054a.

Scenario 1000 then continues with selection of transition curve 1080. In response, roadmap editor 1020 displays selection indicator 1072 about transition curve 1080. Roadmap editor 1020 also updates menu 1022 to replace previously-provided selections about intersection 1064 with selections about transition curve 1080. FIG. 10B shows that menu 1022 includes "Transition Curve 1080 Selections" for transition curve 1080 that include more info selection 1040b, adjust junction points 1046, directionalize transition curves selection 1048, and transition curve family operations selection 1076. In other embodiments, roadmap editor 1020 can add more, fewer, and/or different selections to menu 1022 for operations related to a selected transition curve.

More information selection 1040b can be used to display additional data about transition curve 1080. The additional data can include, but is not limited to, specific location information such as latitude/longitude coordinates for the transition curve, information about junction points and/or curve segments of the transition curve, kinematic and/or other parameters associated with the transition curve, one or more names or labels associated with the transition curve, and comments/notes for the edge interaction region.

Adjust junction points selection 1046 can be used to change junction points and/or curvature of a selected transition curve. For example, after choosing adjust junction points selection 1046 for transition curve 1080, one or more of junction points 1090a-1090d can be moved, thereby changing the size, curvature, and shape of part or all of transition curve 1080. Other examples for adjusting junction points of a selected transition curve are possible as well.

Directionalize transition curves selection 1048 can be used for specifying one or more transition curves as being associated with directed edges, such as discussed above in the context of roadmaps 700, 800, and 900. For example, selected transition curve 1080 can be specified as at least two directed edges: a first directed edge utilizing a first transition curve from edge 1052a to edge 1054a and a second directed edge utilizing a second transition curve from edge 1054a to edge 1052a. Other examples using directed edges for selected transition curves are possible as well.

Transition curve family operations selection 1076 can be used to create, update, insert, and/or delete one or more transition curves associated with a selected transition curve; that is, transition curve family operations selection 1076 can provide one or more operations used to generate and manage families of transition curves. Families of transition curves can be generated based on different configurations and/or types of robotic devices, such as discussed above in the context of roadmaps 800 and 900. Once generated, one or more transition curves in a family of transition curves, including the entire family, can be reviewed, updated, and/or deleted. In some embodiments, families of transition curves can be named (or labeled). Then, transition curve family operations selection 1076 can be used to replace one or more selected transition curves with a specified named family of transition curves. In other embodiments, transition curve family operations selection 1076 can be used to create, update, insert, and/or delete data about one or more selected transition curves; e.g., to name one or more transition curves, to provide, change, and/or review data about robotic device types and/or configurations associated with the selected transition curve(s). Other examples of operations to be performed on a family of one or more selected transition curves are possible as well. Other examples, operations, selections, and/or user interface controls associated with roadmap editor 1020 are possible as well.

Computing Device Architecture

Figure 11A:
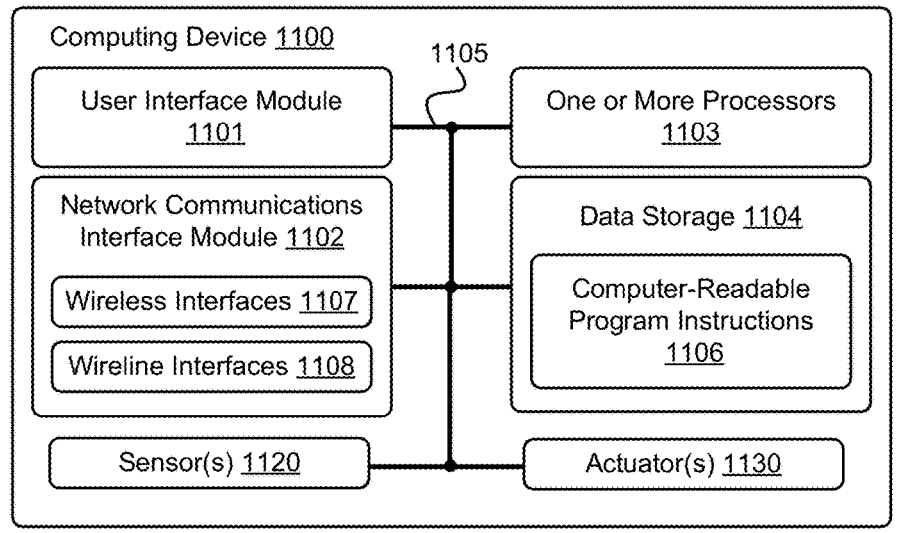
FIG. 11A is a functional block diagram of an example computing device, in accordance with an example embodiment.

FIG. 11A is a functional block diagram of an example computing device 1100, in accordance with an example embodiment. In particular, computing device 1100 shown in FIG. 11A can be configured to perform at least one function of: robotic devices 710, 720, 730, 740, 802, 902, 904, computing device 1010, roadmap editor 1020, and/or one or more functions related to roadmaps 100, 200, 300, 400, 500, 600, 700, 800, 900 graphs 230, 330, 430, 550, scenario 1000, and/or method 1200. Computing device 1100 may include a user interface module 1101, a network-communication interface module 1102, one or more processors 1103, data storage 1104, one or more sensors 1120, and one or more actuators 1130, all of which may be linked together via a system bus, network, or other connection mechanism 1105.

User interface module 1101 can be operable to send data to and/or receive data from external user input/output devices. For example, user interface module 1101 can be configured to send and/or receive data to and/or from user input devices such as a keyboard, a keypad, a touch screen, a computer mouse, a track ball, a joystick, a camera, a voice recognition module, and/or other similar devices. User interface module 1101 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1101 can also be configured to generate audible output(s), such as a speaker, speaker jack, audio output port, audio output device, earphones, and/or other similar devices.

Network-communications interface module 1102 can include one or more wireless interfaces 1107 and/or one or more wireline interfaces 1108 that are configurable to communicate via a network. Wireless interfaces 1107 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 1108 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 1102 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 1103 can include one or more general purpose processors, and/or one or more special purpose processors (e.g., digital signal processors, graphics processing units, application specific integrated circuits, etc.). Processors 1103 can be configured to execute computer-readable program instructions 1106 that are contained in the data storage 1104 and/or other instructions as described herein.

Data storage 1104 can include one or more computer-readable storage media that can be read and/or accessed by at least one of processors 1103. The one or more computer-readable storage media can include volatile and/or non-volatile storage components, such as optical, magnetic, organic or other memory or disc storage, which can be integrated in whole or in part with at least one of processors 1103. In some embodiments, data storage 1104 can be implemented using a single physical device (e.g., one optical, magnetic, organic or other memory or disc storage unit), while in other embodiments, data storage 1104 can be implemented using two or more physical devices.

Data storage 1104 can include computer-readable program instructions 1106 and perhaps additional data. In some embodiments, data storage 1104 can additionally include storage required to perform at least part of the herein-described methods and techniques and/or at least part of the functionality of the devices and networks.

In some embodiments, computing device 1100 can include one or more sensors 1120. Sensor(s) 1120 can be configured to measure conditions in an environment for computing device 1100 and provide data about that environment; e.g., environment 100. For example, sensor(s) 1120 can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of the computing device 1100, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 1100, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor, possibly to obtain; and (iv) a force sensor to measure one or more forces (e.g., inertial forces and/or G-forces) acting about the computing device 1100, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 1120 are possible as well. In some embodiments, some or all of sensors 1120 can be distributed throughout an environment; e.g., identification sensors 174a, 174b dispersed throughout at least cell 160 of environment 100 such as discussed above at least in the context of FIG. 1A.

Computing device 1100 can include one or more actuators 1130 that enable computing device 1100 to initiate movement. For example, actuator(s) 1130 can include or be incorporated with robotic joints connecting robotic limbs to a robotic body. For example, actuator(s) 1130 can include respective robotic hip and robotic shoulder joints connecting respective robotic legs and arms to the robotic body. Further, the actuator(s) 1130 can include respective robotic knee joints connecting respective portions of the robotic legs (e.g., robotic thighs and robotic calves) and elbow joints connecting portions of the robotic arms (e.g., robotic forearms and upper arms). Yet further, actuator(s) 1130 can include respective robotic ankle joints connecting the robotic legs to robotic feet and respective robotic wrist joints connecting the robotic arms to robotic hands. In addition, actuator(s) 1130 can include motors for moving the robotic limbs. As such, the actuator(s) 1130 can enable mobility of computing device 1100. Other examples of actuator(s) 1130 are possible as well.

Cloud-Based Servers

Figure 11B:
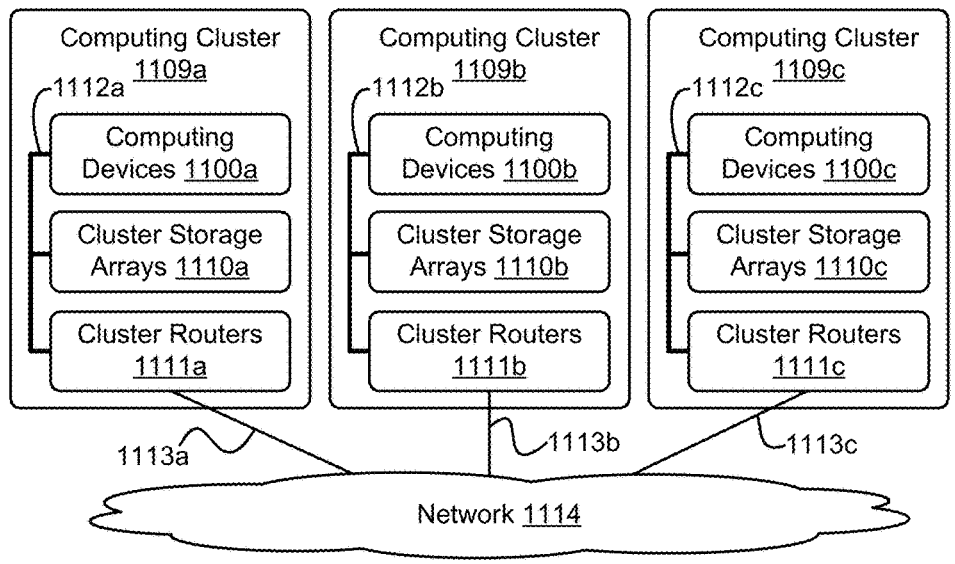
FIG. 11B depicts a network of computing clusters arranged as a cloud-based server system, in accordance with an example embodiment.

FIG. 11B depicts a network of computing clusters arranged as a cloud-based server system, in accordance with an example embodiment. FIG. 11B depicts a network 1114 of computing clusters 1109a, 1109b, 1109c arranged as a cloud-based server system in accordance with an example embodiment. Computing clusters 1109a, 1109b, 1109c can be cloud-based devices that store program logic and/or data of cloud-based applications and/or services; e.g., perform at least one function of: robotic devices 710, 720, 730, 740, 802, 902, 904, computing device 1010, roadmap editor 1020, and/or one or more functions related to roadmaps 100, 200, 300, 400, 500, 600, 700, 800, 900 graphs 230, 330, 430, 550, scenario 1000, and/or method 1200.

In some embodiments, computing clusters 1109a, 1109b, 1109c can be a single computing device residing in a single computing center. In other embodiments, computing clusters 1109a, 1109b, 1109c can include multiple computing devices in a single computing center, or even multiple computing devices located in multiple computing centers located in diverse geographic locations. For example, FIG. 11B depicts each of computing clusters 1109a, 1109b, 1109c residing in different physical locations.

In some embodiments, data and services at computing clusters 1109a, 1109b, 1109c can be encoded as computer readable information stored in non-transitory, tangible computer readable media (or computer readable storage media) and accessible by other computing devices. In some embodiments, computing clusters 1109a, 1109b, 1109c can be stored on a single disk drive or other tangible storage media, or can be implemented on multiple disk drives or other tangible storage media located at one or more diverse geographic locations.

FIG. 11B depicts a cloud-based server system in accordance with an example embodiment. In FIG. 11B, functionality of a computing device and/or robotic device can be distributed among three computing clusters 1109a, 1109b, and 1109c. Computing cluster 1109a can include one or more computing devices 1100a, cluster storage arrays 1110a, and cluster routers 1111a connected by a local cluster network 1112a. Similarly, computing cluster 1109b can include one or more computing devices 1100b, cluster storage arrays 1110b, and cluster routers 1111b connected by a local cluster network 1112b. Likewise, computing cluster 1109c can include one or more computing devices 1100c, cluster storage arrays 1110c, and cluster routers 1111c connected by a local cluster network 1112c.

In some embodiments, each of the computing clusters 1109a, 1109b, and 1109c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1109a, for example, computing devices 1100a can be configured to perform various computing tasks of a computing device and/or robotic device. In one embodiment, the various functionalities of a computing device and/or robotic device can be distributed among one or more computing devices 1100a, 1100b, and 1100c. Computing devices 1100b and 1100c in respective computing clusters 1109b and 1109c can be configured similarly to computing devices 1100a in computing cluster 1109a. On the other hand, in some embodiments, computing devices 1100a, 1100b, and 1100c can be configured to perform different functions.

In some embodiments, computing tasks and stored data associated with a computing device and/or robotic device can be distributed across computing devices 1100a, 1100b, and 1100c based at least in part on the processing requirements of a computing device and/or robotic device, the processing capabilities of computing devices 1100a, 1100b, and 1100c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 1110a, 1110b, and 1110c of the computing clusters 1109a, 1109b, and 1109c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a computing device and/or robotic device can be distributed across computing devices 1100a, 1100b, and 1100c of computing clusters 1109a, 1109b, and 1109c, various active portions and/or backup portions of these components can be distributed across cluster storage arrays 1110a, 1110b, and 1110c. For example, some cluster storage arrays can be configured to store one portion of the data of a computing device and/or robotic device can, while other cluster storage arrays can store other portion(s) of data of a computing device and/or robotic device. Additionally, some cluster storage arrays can be configured to store backup versions of data stored in other cluster storage arrays.

The cluster routers 1111a, 1111b, and 1111c in computing clusters 1109a, 1109b, and 1109c can include networking equipment configured to provide internal and external communications for the computing clusters. For example, the cluster routers 1111a in computing cluster 1109a can include one or more internet switching and routing devices configured to provide (i) local area network communications between the computing devices 1100a and the cluster storage arrays 1110a via the local cluster network 1112a, and (ii) wide area network communications between the computing cluster 1109a and the computing clusters 1109b and 1109c via the wide area network connection 1113a to network 1114. Cluster routers 1111b and 1111c can include network equipment similar to the cluster routers 1111a, and cluster routers 1111b and 1111c can perform similar networking functions for computing clusters 1109b and 1109b that cluster routers 1111a perform for computing cluster 1109a.

In some embodiments, the configuration of the cluster routers 1111a, 1111b, and 1111c can be based at least in part on the data communication requirements of the computing devices and cluster storage arrays, the data communications capabilities of the network equipment in the cluster routers 1111a, 1111b, and 1111c, the latency and throughput of local networks 1112a, 1112b, 1112c, the latency, throughput, and cost of wide area network links 1113a, 1113b, and 1113c, and/or other factors that can contribute to the cost, speed, fault-tolerance, resiliency, efficiency and/or other design goals of the moderation system architecture.

Example Methods of Operation

Figure 12:
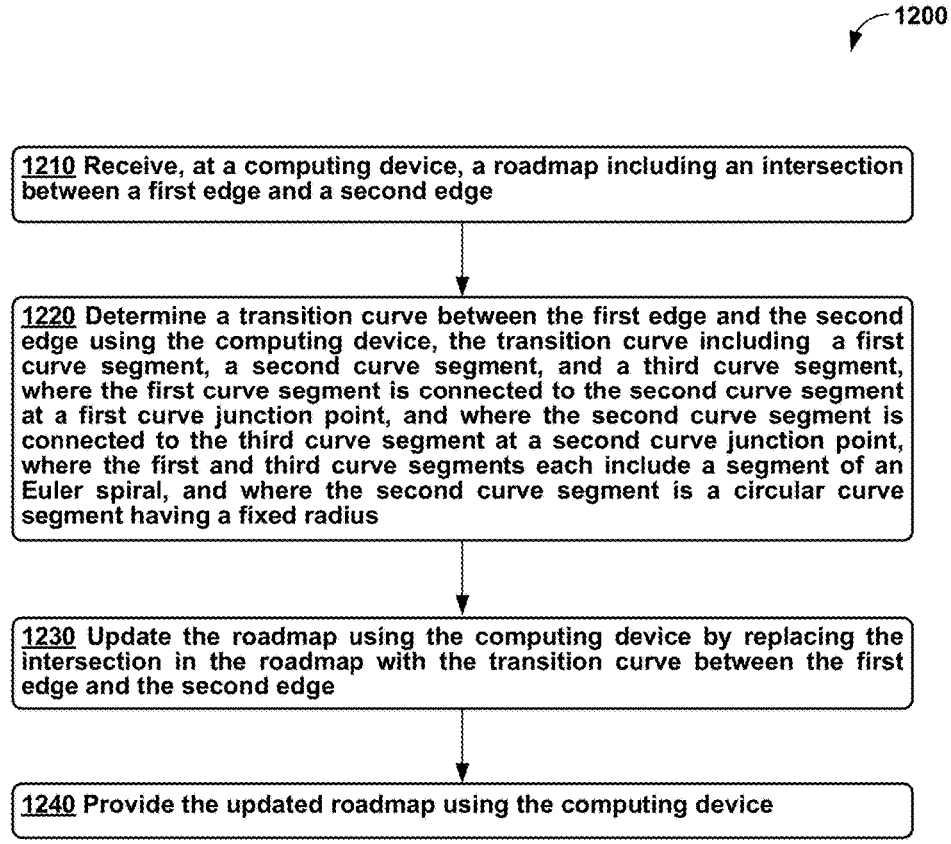
FIG. 12 is a flowchart of a method, in accordance with an example embodiment.

FIG. 12 is a flowchart of method 1200, in accordance with an example embodiment. Method 1200 can be executed by a computing device, such as computing device 1100 discussed above.

Method 1200 can begin at block 1210, where the computing device can receive a roadmap that can include an intersection between a first edge and a second edge, such as discussed above in the context of at least FIGS. 1-5D, 10A, and 10B. In some embodiments, the roadmap can be used by one or more robotic devices in navigating within an environment.

At block 1220, the computing device can determine a transition curve between the first edge and the second edge using the computing device, the transition curve including a first curve segment, a second curve segment, and a third curve segment, where the first curve segment connects to the second curve segment at a first curve junction point, where the second curve segment connects to the third curve segment at a second curve junction point, where the first and third curve segments can each include a segment of an Euler spiral, and where the second curve segment is a circular curve segment having a fixed radius, such as discussed above in the context of at least FIGS. 2A-5D, 10A, and 10B.

In some embodiments, a first curvature of the first curve segment at the first curve junction point can be within a threshold amount of a second curvature of the second curve segment at the first curve junction point, and a third curvature of the second curve segment at the second curve junction point can be within a threshold amount of a fourth curvature of the third curve segment at the second curve junction point, such as discussed above in the context of at least FIG. 2B.

In other embodiments, the first junction point can be selected based on one or more of: a turning radius of a robotic device, a maximum speed of the robotic device, and a maximum acceleration of a robotic device, such as discussed above in the context of at least FIG. 2B. In still other embodiments, the fixed radius can be based upon a turning radius of a robotic device, such as discussed above in the context of at least FIG. 2B. In even other embodiments, determining the transition curve between the first edge and the second edge can include determining a rate of curvature based on a geometry of the intersection between the first edge and the second edge, such as discussed above in the context of at least FIGS. 2B and 4B. In yet other embodiments, determining the transition curve between the first edge and the second edge can include determining a maximum length that the first curve segment travels along the first edge, such as discussed above in the context of at least FIG. 2B.

At block 1230, the computing device can update the roadmap using the computing device by replacing the intersection in the roadmap with the transition curve between the first edge and the second edge, such as discussed above in the context of at least FIGS. 2A-5D, 10A, and 10B.

At block 1240, the computing device can provide the updated roadmap using the computing device, such as discussed above in the context of at least FIGS. 2A-5D, 7, 10A, and 10B. In some embodiments, providing the updated roadmap using the computing device can include displaying the updated roadmap using a user interface of the computing device, where the user interface can enable modification of the transition curve between the first edge and the second edge, such as discussed above in the context of at least FIGS. 10A and 10B.

In some embodiments, method 1200 can further include: directing a robotic device to use the roadmap in taking the transition curve to travel between the first edge and the second edge, such as discussed above in the context of at least FIGS. 7-9.

In other embodiments, the roadmap can include a second intersection between the second edge and a third edge. Then, method 1200 can further include: determining a second transition curve between the first edge and the third edge using the computing device, wherein the second transition curve comprises a fourth curve segment, a fifth curve segment, and a sixth curve segment, where the fourth and sixth curve segments each include a segment of an Euler spiral, and where the fifth curve segment is a circular curve segment having a second fixed radius, such as discussed above in the context of at least FIGS. 3A-5D. In particular of these embodiments, the first and third edges can be in a same direction, and the first transition curve and the second transition curve can be oriented different from each other, such as discussed above in the context of at least FIGS. 3B, 3D, 4B, and 4D. In more particular of these embodiments, the fourth curve segment can connect to the fifth curve segment at a third curve junction point, and the fifth curve segment can connect to the sixth curve segment at a fourth curve junction point, such as discussed above in the context of at least FIGS. 3A-5D. In even more particular of these embodiments, a first curvature of the fourth curve segment at the third curve junction point can be within a threshold amount of a second curvature of the fifth curve segment at the third curve junction point, and wherein a third curvature of the fifth curve segment at the fourth curve junction point can be within a threshold amount of a fourth curvature of the sixth curve segment at the fourth curve junction point, such as discussed above in the context of at least FIGS. 3A-5D.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
determining, by a computing device, a roadmap of an environment, the roadmap comprising a transition curve between a first edge and a second edge, the transition curve comprising a first curve segment, a second curve segment, and a third curve segment, wherein the first curve segment connects to the second curve segment at a first curve junction point, wherein the second curve segment connects to the third curve segment at a second curve junction point, wherein the first and third curve segments each comprise a segment of an Euler spiral, and wherein the second curve segment is a circular curve segment having a fixed radius;
providing, by the computing device, the roadmap of the environment to a robotic device; and
providing, by the computing device to the robotic device, instructions causing the robotic device to follow the roadmap of the environment to travel from an origin in the environment to a destination in the environment by following at least the first curve segment, the second curve segment, and the third curve segment of the transition curve as determined in the roadmap of the environment.

2. The method of claim 1, wherein a first curvature of the first curve segment at the first curve junction point is within a threshold amount of a second curvature of the second curve segment at the first curve junction point.

3. The method of claim 2, wherein a third curvature of the second curve segment at the second curve junction point is within the threshold amount of a fourth curvature of the third curve segment at the second curve junction point.

4. The method of claim 1, wherein the first curve junction point is selected based on one or more of: a turning radius of the robotic device, a maximum speed of the robotic device, or a maximum acceleration of the robotic device.

5. The method of claim 1, wherein the fixed radius is based upon a turning radius of the robotic device.

6. The method of claim 1, wherein the roadmap represents traversable areas of a warehouse.

7. The method of claim 1, further comprising:
determining a maximum length that the first curve segment travels along the first edge; and
determining the transition curve between the first edge and the second edge based on the maximum length.

8. The method of claim 1, wherein the roadmap comprises another intersection between the second edge and a third edge, and wherein the method further comprises:
determining a second transition curve between the second edge and the third edge using the computing device, wherein the second transition curve comprises a fourth curve segment, a fifth curve segment, and a sixth curve segment, wherein the fourth and sixth curve segments each comprise a segment of an Euler spiral, and wherein the fifth curve segment is a circular curve segment having a second fixed radius.

9. The method of claim 8, wherein the first and third edges are in a same direction, and wherein the transition curve and the second transition curve are oriented different from each other.

10. The method to claim 8, wherein the fourth curve segment connects to the fifth curve segment at a third curve junction point, and wherein the fifth curve segment connects to the sixth curve segment at a fourth curve junction point.

11. The method of claim 10, wherein a first curvature of the fourth curve segment at the third curve junction point is within a threshold amount of a second curvature of the fifth curve segment at the third curve junction point, and wherein a third curvature of the fifth curve segment at the fourth curve junction point is within a threshold amount of a fourth curvature of the sixth curve segment at the fourth curve junction point.

12. The method of claim 1, wherein the method further comprises:
displaying the roadmap using a user interface of the computing device, wherein the user interface enables modification of the transition curve between the first edge and the second edge.

13. A computing device, comprising:
one or more processors; and
data storage including at least computer-executable instructions stored thereon that, when executed by the one or more processors, cause the computing device to perform functions comprising:
determining a roadmap of an environment, the roadmap comprising a transition curve between a first edge and a second edge, the transition curve comprising a first curve segment, a second curve segment, and a third curve segment, wherein the first curve segment connects to the second curve segment at a first curve junction point, wherein the second curve segment connects to the third curve segment at a second curve junction point, wherein the first and third curve segments each comprise a segment of an Euler spiral, and wherein the second curve segment is a circular curve segment having a fixed radius;
providing, the roadmap of the environment to a robotic device; and
providing to the robotic device, instructions causing the robotic device to follow the roadmap of the environment to travel from an origin in the environment to a destination in the environment by following at least the first curve segment, the second curve segment, and the third curve segment of the transition curve as determined in the roadmap of the environment.

14. The computing device of claim 13, wherein a first curvature of the first curve segment at the first curve junction point is within a threshold amount of a second curvature of the second curve segment at the first curve junction point.

15. The computing device of claim 14, wherein a third curvature of the second curve segment at the second curve junction point is within the threshold amount of a fourth curvature of the third curve segment at the second curve junction point.

16. The computing device of claim 13, wherein the first curve junction point is selected based on one or more of: a turning radius of the robotic device, a maximum speed of the robotic device, or a maximum acceleration of the robotic device.

17. The computing device of claim 13, wherein the fixed radius is based upon a turning radius of the robotic device.

18. The computing device of claim 13, further comprising a user interface, wherein the functions further comprise displaying the roadmap using the user interface of the computing device.

19. The computing device of claim 18, wherein the user interface enables modification of the transition curve between the first edge and the second edge.

20. A non-transitory computer readable medium having stored thereon instructions, that when executed by one or more processors, cause the one or more processors to perform functions comprising:
determining a roadmap of an environment, the roadmap comprising a transition curve between a first edge and a second edge, the transition curve comprising a first curve segment, a second curve segment, and a third curve segment, wherein the first curve segment connects to the second curve segment at a first curve junction point, wherein the second curve segment connects to the third curve segment at a second curve junction point, wherein the first and third curve segments each comprise a segment of an Euler spiral, and wherein the second curve segment is a circular curve segment having a fixed radius;
providing, the roadmap of the environment to a robotic device; and
providing, to the robotic device, instructions causing the robotic device to follow the roadmap of the environment to travel from an origin in the environment to a destination in the environment by following at least the first curve segment, the second curve segment, and the third curve segment of the transition curve as determined in the roadmap of the environment.

* * * * *